(12) United States Patent
Nabeel et al.

(10) Patent No.: US 11,206,275 B2
(45) Date of Patent: Dec. 21, 2021

(54) METHOD AND SYSTEM FOR DOMAIN MALICIOUSNESS ASSESSMENT VIA REAL-TIME GRAPH INFERENCE

(71) Applicant: Qatar Foundation for Education, Science and Community Development, Doha (QA)

(72) Inventors: Mohamed Nabeel, Doha (QA); Issa M. Khalil, Doha (QA); Ting Yu, Doha (QA); Euijin Choo, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 272 days.

(21) Appl. No.: 16/426,477

(22) Filed: May 30, 2019

(65) Prior Publication Data

US 2020/0382533 A1 Dec. 3, 2020

(51) Int. Cl.
*H04L 29/06* (2006.01)
*G06N 20/00* (2019.01)
*H04L 29/12* (2006.01)
*H04L 12/26* (2006.01)
*G06N 20/20* (2019.01)
(Continued)

(52) U.S. Cl.
CPC ......... *H04L 63/1425* (2013.01); *G06N 5/025* (2013.01); *G06N 20/00* (2019.01); *G06N 20/20* (2019.01); *H04L 41/145* (2013.01); *H04L 41/22* (2013.01); *H04L 43/045* (2013.01); *H04L 61/1511* (2013.01); *H04L 61/35* (2013.01); *G06N 5/003* (2013.01); *G06N 20/10* (2019.01); *H04L 41/16* (2013.01)

(58) Field of Classification Search
CPC ........ G06N 5/003; G06N 5/025; G06N 20/00; G06N 20/10; G06N 20/20; H04L 41/145; H04L 41/16; H04L 41/22; H04L 43/045; H04L 61/1511; H04L 61/35; H04L 63/1425
See application file for complete search history.

(56) References Cited

U.S. PATENT DOCUMENTS 7,783,780 B2   8/2010  Stahura
8,762,298 B1 * 6/2014  Ranjan ................. G06F 21/552
                                                    706/12
(Continued)

*Primary Examiner* — Thomas J Dailey
(74) *Attorney, Agent, or Firm* — K&L Gates LLP

(57) ABSTRACT

The presently disclosed method and system exploits information and traces contained in DNS data to determine the maliciousness of a domain based on the relationship it has with other domains. A method may comprise providing data to a machine learning module that was previously trained on domain and IP address attributes or classifiers. The method then may comprise classifying apex domains and IP addresses based on the IP address and domain attributes or classifiers. Additionally, the method may comprise associated each of the domains and IP addresses based on the corresponding classification. The method may further comprise building a weighted domain graph at real-time utilizing the DNS data based on the aforementioned associations among domains. The method may then comprise assessing the maliciousness of a domain based on the weighted domain graph that was built.

18 Claims, 13 Drawing Sheets

(51) Int. Cl.
*G06N 5/02* (2006.01)
*H04L 12/24* (2006.01)
*G06N 5/00* (2006.01)
*G06N 20/10* (2019.01)

(56) References Cited

U.S. PATENT DOCUMENTS

| | | | |
|---|---|---|---|
| 8,813,228 B2* | 8/2014 | Magee | H04L 63/20 |
| | | | 726/24 |
| 9,324,022 B2 | 4/2016 | Williams, Jr. et al. | |
| 9,531,738 B2* | 12/2016 | Zoldi | H04L 67/30 |
| 9,749,336 B1* | 8/2017 | Zhang | H04L 63/0236 |
| 2012/0042381 A1* | 2/2012 | Antonakakis | H04L 63/1483 |
| | | | 726/22 |
| 2012/0158626 A1* | 6/2012 | Zhu | H04L 63/1408 |
| | | | 706/13 |
| 2014/0331319 A1 | 11/2014 | Munro, IV et al. | |
| 2019/0028508 A1 | 1/2019 | Jeng et al. | |

\* cited by examiner

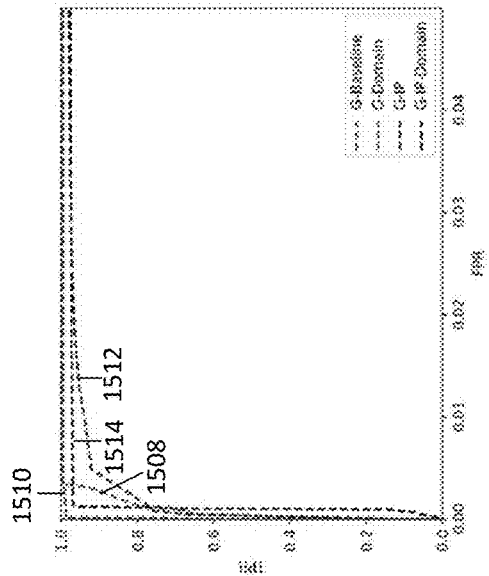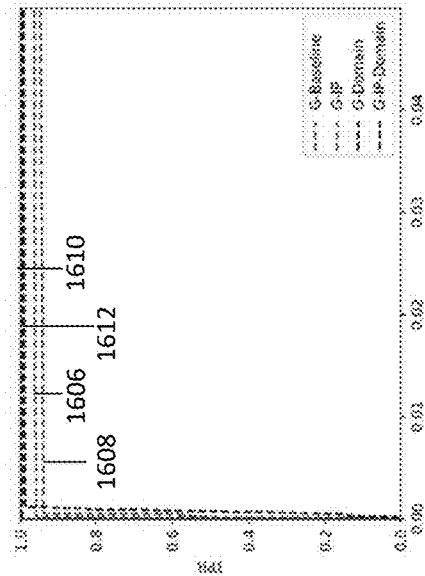
FIG. 15A  FIG. 15B  FIG. 16A  FIG. 16B
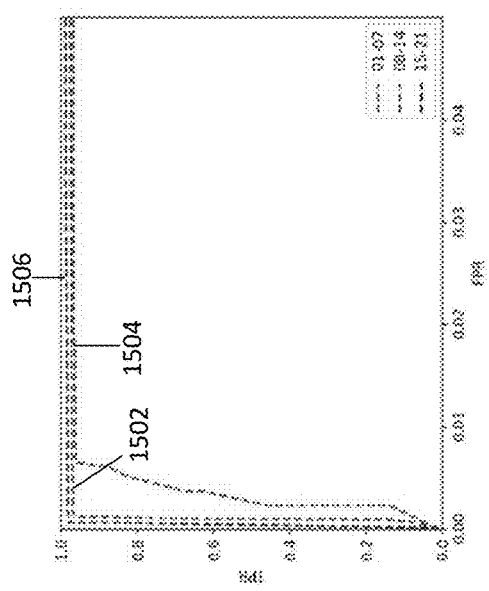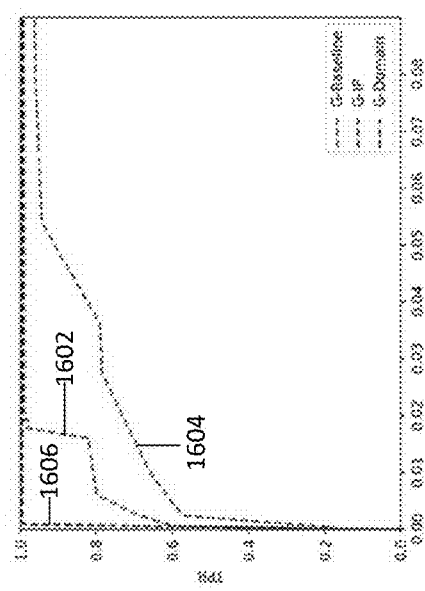

METHOD AND SYSTEM FOR DOMAIN MALICIOUSNESS ASSESSMENT VIA REAL-TIME GRAPH INFERENCE

BACKGROUND

A domain name system ("DNS"), provided on the Internet, maps domain names to Internet Protocol ("IP") addresses associated with that domain name. Some of these domains may be considered malicious, taking part in malicious behavior such as the dispersal of sensitive information (such as login account details and credit card information), sending spam emails, attempting financial fraud, phishing, and many other activities. As Internet traffic and the number of domains continues to grow, the amount of malicious domains increases, becoming a serious problem.

Though some malicious domain tracking methods exist, these methods typically only search local DNS features and other sources for clear signs that a domain is malicious, ignoring subtle links between known malicious domains and unknown domains. Local DNS features include a time-to-live, number of IP addresses in which a domain is hosted, etc., which are relatively easy to manipulate and not robust against adversarial manipulations. Searching other sources include analyzing webpage content that is hosted at a given domain to detect malicious domains. While the analysis of local DNS features and webpage content may help identify malicious domains, the analysis cannot be scaled for large number of domains. Further, by the time a malicious domain is identified, most of the damage from malicious activity is already done. As a result, known malicious domain tracking methods are insufficient in detecting malicious domains in a timely manner.

As time has passed, the creators of malicious domains have become more sophisticated, creating malicious domains in such a way that the domains avoid known DNS searching methods. For instance, through the use of public and private hosting services, IP addresses, and other masking methods, an entity deploying a malicious domain may conceal its malicious links by deploying the malicious domain in the same hosting service or IP address as that of many known benign domains. On the other hand, due to the way domains are deployed on the Internet, the benign domains may be linked to malicious domains and flagged as malicious by the basic DNS searching methods. Therefore, there exists a need for a solution to analyze domain relationships to identify subtle traces in corresponding DNS traffic data, linking domains of unknown maliciousness to known malicious and benign domains through the use of weighted domain graphs. Furthermore, this solution must be able to make these inferences in real-time, have a high degree of accuracy, and minimize false identification of benign domains as malicious.

BRIEF SUMMARY OF THE INVENTION

The presently described method and system is a method and system for assessing the maliciousness of domains via real-time graph inference. The system and method enables the maliciousness of one or more domains to be analyzed and assessed based on the relationships between the one or more domains and any other domains, IP addresses, apex domains, or hosting providers. An apex or second-level domain includes a domain that is public and dedicated. An example system can receive and classify a collection of domains and IP addresses, associate these classified apex domains (e.g., second-level domains) and classified IP addresses with domains, build a weighted domain graph based on the associations, and assess the maliciousness of these domains using real-time graph inference.

As described herein, an apex domain classifier is configured to classify each apex domain as public or dedicated. A public apex domain is associated with two or more unrelated subdomains which are controlled by different entities, whereas a dedicate apex domain consists of subdomains, all of which are controlled by the same entity. Similarly, a public IP address is used to host two or more unrelated domains controlled by different entities, whereas a dedicated IP address is used to host domains all of which are controlled by the same entity.

In light of the disclosures herein, and without limiting the scope of the invention in any way, in a first aspect of the present disclosure, which may be combined with any other aspect listed herein unless specified otherwise, a method is provided comprising providing data to a machine learning module, wherein the machine learning model was previously trained on a plurality of Internet Protocol ("IP") address attributes and a plurality of domain attributes and a list of known malicious domains, and wherein the data comprises a plurality of domains and a plurality of IP addresses. The method further comprises classifying each of the plurality of domains and the plurality of IP addresses within the data based on the plurality of IP address attributes and the plurality of domain attributes. The method additionally comprises associating each of the plurality of domains and the plurality of IP addresses within the data based on the corresponding classification. In addition, the method comprises building a weighted domain graph based on the classification and association of each of the plurality of apex domains and the plurality of IP addresses within the data. The method also comprises assessing the maliciousness of a domain based on the weighted domain graph.

In a second aspect of the present disclosure, which may be combined with any other aspect listed herein unless specified otherwise, the plurality of IP address attributes comprises a plurality of IP address attribute sets.

In a third aspect of the present disclosure, which may be combined with any other aspect listed herein unless specified otherwise, the plurality of IP address attribute sets comprises a domain based attribute set comprising a first attribute detailing a number of fully qualified domain names, a second attribute detailing a number of third level domains, a third attribute detailing a mean duration, and fourth attribute detailing a standard deviation of duration. The plurality of IP address attribute sets also comprises an IP address block based attribute set comprising a fifth attribute detailing a number of IP addresses in its /24 IP address block, a sixth attribute detailing a number of second level domains in its /24 IP address block, a seventh attribute detailing a number of third level domains in its /24 IP address block, and an eighth attribute detailing an entropy of IP addresses in its /24 IP address block. In addition, the plurality of IP address attribute sets comprises a query based attribute set comprising a ninth attribute detailing an average number of daily queries for each IP address, a tenth attribute detailing a mean number of DNS lookup queries per domain, and an eleventh attribute detailing a standard deviation of the number of DNS lookup queries per domain In a fourth aspect of the present disclosure, which may be combined with any other aspect listed herein unless specified otherwise, the plurality of domain attributes comprises a plurality of domain attribute sets.

In a fifth aspect of the present disclosure, which may be combined with any other aspect listed herein unless specified otherwise, the plurality of domain attribute sets comprises a plurality of domain attribute sets comprises a plurality of domain attribute sets comprises a domain based attribute set comprising a twelfth attribute detailing an average Jaccard similarity between subdomains of the same apex domain (e.g., the second-level domain), a thirteenth attribute detailing a standard deviation of fully qualified domain names ("FQDNs") belonging to the same apex domain, a fourteenth attribute detailing an average presence of generic top level domains in a subdomain part of each FQDN, a fifteenth attribute detailing a standard deviation of the presence of generic top level domains in a subdomain part of each FQDN, a sixteenth attribute detailing an entropy of the subdomains of each apex domain, a seventeenth attribute detailing an average number of top frequently seen subdomains of each apex domain, and an eighteenth attribute detailing an average number of popular subdomains belonging to a given apex domain over each resolved IP address. The plurality of domain attribute sets also comprises an IP address based attribute set comprising a nineteenth attribute detailing the similarity of the IP addresses hosting all domains, a twentieth attribute detailing an average number of IP addresses on which each domain resolves to per day, a twenty-first attribute detailing the standard deviation of the number of IP addresses on which each domain resolves to per day, a twenty-second attribute detailing the number of 24-subnets in which IP addresses are hosting domains. The plurality of domain attribute sets further comprises a query based attribute set comprising a twenty-third attribute detailing an average of a number of DNS lookup queries and a twenty-fourth attribute detailing a standard deviation of the number of DNS lookup queries. Additionally, the plurality of domain attribute sets comprises a hosting based attribute set comprising a twenty-fifth attribute detailing an average of hosting durations of all hosted domains and a twenty-sixth attribute detailing a standard deviation of hosting durations of all hosted domains.

In a sixth aspect of the present disclosure, classifying each of the plurality of domains and the plurality of IP addresses within the data based on the plurality of IP address classifier and the plurality of apex domain classifier comprises classifying domains or IP addresses as public or dedicated.

In a seventh aspect of the present disclosure, which may be combined with any other aspect listed herein unless specified otherwise, a public classification denotes an apex domain whose subdomains belong to different entities; a dedicated classification denotes an apex domain whose subdomains belong to the same entity; a public IP address classification denotes an IP address used to host two or more unrelated domains controlled by different entities; and a dedicated IP address classification denotes an IP address used to host domains all of which are controlled by the same entity.

In an eighth aspect of the present disclosure, which may be combined with any other aspect listed herein unless specified otherwise, classifying each of the plurality of domains and the plurality of IP addresses within the data based on the plurality of IP address classifier and the plurality of apex domain classifier further comprises the use of a random forest classification algorithm.

In a ninth aspect of the present disclosure, which may be combined with any other aspect listed herein unless specified otherwise, associating each of the plurality of domains and the plurality of IP addresses within the data based on its classification comprises associating domains based on the plurality of IP address classifications.

In a tenth aspect of the present disclosure, which may be combined with any other aspect listed herein unless specified otherwise, associating each of the plurality of domains and the plurality of IP addresses within the data based on its classification comprises associating domains based on the plurality of apex domain classifications.

In an eleventh aspect of the present disclosure, which may be combined with any other aspect listed herein unless specified otherwise, associating each of the plurality of domains and the plurality of IP addresses within the data based on its classification comprises associating domains based on the plurality of IP address classifications and associating domains based on the plurality of apex domain classifications.

In a twelfth aspect of the present disclosure, which may be combined with any other aspect listed herein unless specified otherwise, associating domains based on the plurality of IP address classifications comprises a first act of association wherein each of the plurality of domains are associated to another one of the plurality of domains that shares at least one IP address classified as a dedicated IP address and a second act of association wherein each of the plurality of domains are associated to any one of the plurality of domains that share more than one IP address classified as a public IP address from more than one hosting provider.

In a thirteenth aspect of the present disclosure, which may be combined with any other aspect listed herein unless specified otherwise, associating domains based on the plurality of apex domain classifications comprises a third act of association, wherein each of the plurality of domains, classified as dedicated, are associated with the same dedicated apex domain.

In a fourteenth aspect of the present disclosure, which may be combined with any other aspect listed herein unless specified otherwise, building a weighted domain graph based on the classification and association of each of the plurality of domains and the plurality of IP addresses within the data comprises building a weightless domain graph.

In a fifteenth aspect of the present disclosure, which may be combined with any other aspect listed herein unless specified otherwise, building a weighted domain graph based on the classification and association of each of the plurality of domains and the plurality of IP addresses within the data comprises building an apex domain association from the domain graph or the weighted domain graph.

In a sixteenth aspect of the present disclosure, which may be combined with any other aspect listed herein unless specified otherwise, building a weighted domain graph based on the classification and association of each of the plurality of domains and the plurality of IP addresses within the data comprises building a domain-IP address graph from the domain graph or the weighted domain graph.

In a seventeenth aspect of the present disclosure, which may be combined with any other aspect listed herein unless specified otherwise, building the domain graph comprises determining a first association weight between at least two associated domains based on at least a set of shared classified IP addresses, a set of shared IP addresses classified as dedicated, a set of shared IP addresses classified as public, and a set of hosting providers to which the set of shared IP addresses classified as public belong and determining a second association weight between at least two associated domains based on at least a shared apex domain classification and the number of hosting providers to which a set of IP addresses corresponding to the at least two associated domains belong.

In an eighteenth aspect of the present disclosure, which may be combined with any other aspect listed herein unless specified otherwise, assessing the maliciousness of a domain based on the weighted domain graph comprises using a belief propagation algorithm based on at least a domain-IP association derived from the domain graph In a nineteenth aspect of the present disclosure, which may be combined with any other aspect listed herein unless specified otherwise, a malicious domain assessment system comprises a processor and a memory storing instructions which, when executed by the processor, cause the processor to provide data to a machine learning module, wherein the machine learning model was previously trained on a plurality of IP address classifiers and a plurality of apex domain classifiers and wherein the data comprises a plurality of domains and a plurality of IP addresses, classify each of the plurality of domains and the plurality of IP addresses within the data based on the plurality of IP address classifier and the plurality of apex domain classifier, associate each of the plurality of domains and the plurality of IP addresses within the data based on its classification, build a weighted domain graph based on the classification and association of each of the plurality of domains and the plurality of IP addresses within the data, and assess the maliciousness of a domain based on the weighted domain graph.

In a twentieth aspect of the present disclosure, which may be combined with any other aspect listed herein unless specified otherwise, a non-transitory, computer-readable medium storing instructions which, when performed by a processor, may cause the processor to provide data to a machine learning module, wherein the machine learning model was previously trained on a plurality of IP address classifier and a plurality of apex domain classifier and wherein the data comprises a plurality of domains and a plurality of IP addresses, classify each of the plurality of domains and the plurality of IP addresses within the data based on the plurality of IP address classifier and the plurality of apex domain classifier, associate each of the plurality of domains and the plurality of IP addresses within the data based on its classification, build a weighted domain graph based on the classification and association of each of the plurality of domains and the plurality of IP addresses within the data, and assess the maliciousness of a domain based on the inference of the weighted domain graph.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 15A and 15B illustrate the results of experimental validation of a method of the present disclosure.

FIGS. 16A and 16B illustrate the results of experimental validation of a method of the present disclosure.

DETAILED DESCRIPTION

Figure 1:
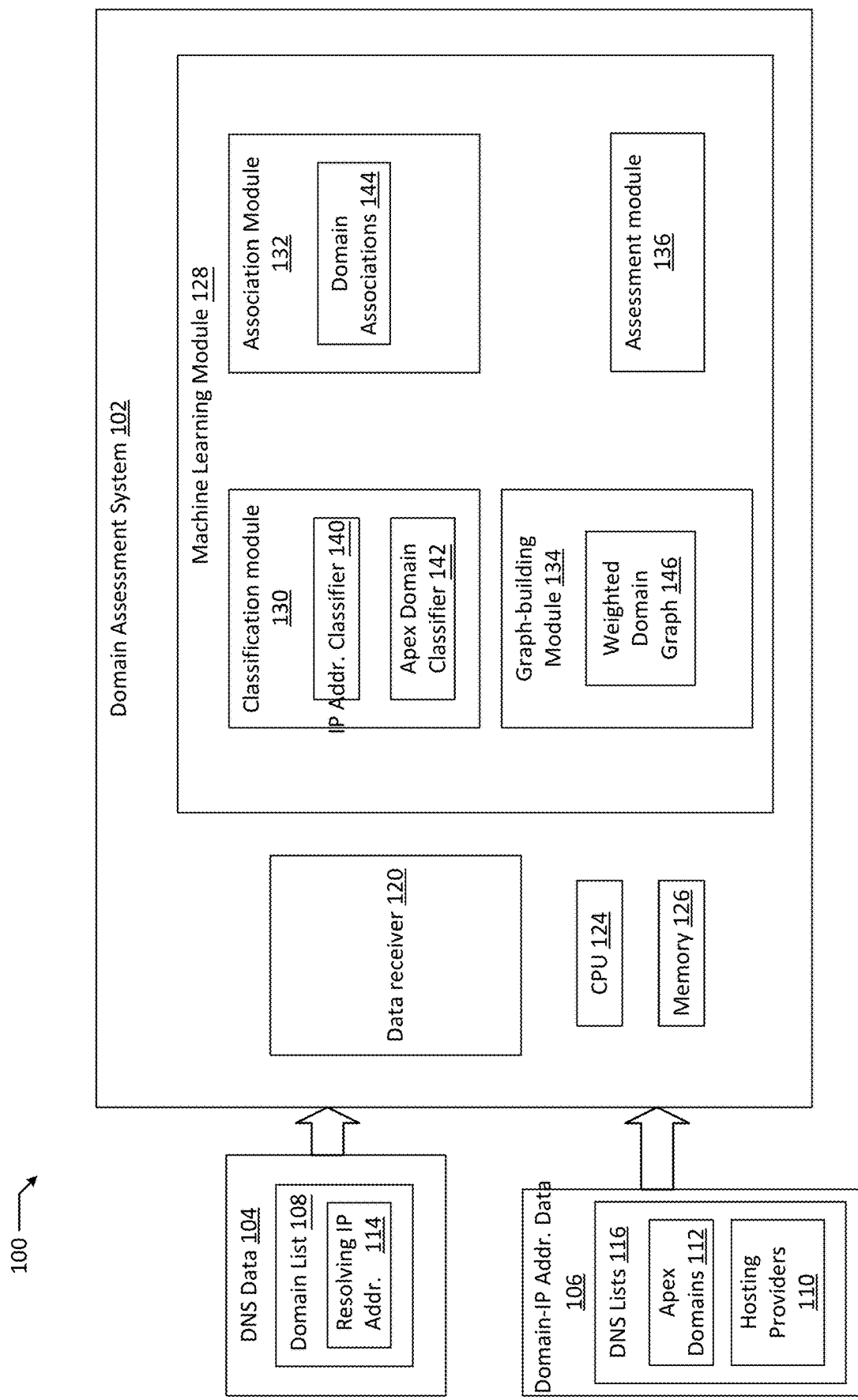
FIG. 1 illustrates an example embodiment of a system of the present disclosure.

The number of domains accessible via the Internet is increasing rapidly. As the number of total domains increases, so too does the number of malicious domains. These domains act as the gateway through which a malicious entity may commit a cyber-attack such as financial fraud, installation of malware or ransomware, phishing attempts, and many more. Thus, detecting these malicious domains in a timely manner is important not only to identify domains on which cyber-attacks have occurred, but also to take preventative measures by identifying these malicious domains before a cyber-attack takes place.

Generally, DNS data is utilized in the detection of malicious domains as one of the most notable sources of information. DNS data may be utilized in two general approaches for such a maliciousness analysis. One general approach is that of a classification-based approach. In this approach, a classifier is built from local features of domains extracted from the DNS data, which may be further enriched with other network and host features. In addition, a classifier, for example a machine-learning module, is trained using a ground truth dataset containing both benign and malicious domains. Based on the training, the classifier is then used to classify new, unknown domains.

A second type of approach comprises inference-based approaches. This second type of approach focuses on building associations between domains from DNS data to reflect their meaningful connections. For example, one association may be that the domains are deployed and/or controlled by the same entity. Once the associations have been established, an inference based approach deploys an inference algorithm to assess the maliciousness of a domain based on its associations with known malicious and benign domains.

In prior solutions for assessing the maliciousness of an unknown domain through use of an inference-based approach, a belief propagation algorithm has been applied to analyze system and network logs to infer malicious entities. In this algorithm, domain associations are identified based on the DNS data alone, essentially identifying whether the domains are resolved to the same IP address or not. While intuitive, such an association provides a very weak link between the domains as it fails to consider the many complicated ways that domains are deployed in the Internet. For example, public web hosting and proxy services cause unrelated domains to be hosted at the same pool of IP addresses. Although the domains are unrelated, because they are hosted at the same IP address, prior solutions making use of the belief propagation algorithm will identify a benign domain as malicious.

In other prior solutions, a path-based algorithm specifically designed for graph based DNS data analysis has been utilized. Though this algorithm improves upon the accuracy of the belief propagation algorithm, it is computationally expensive.

One innovative solution to these problems is to construct algorithms with a new set of richer and stronger associations that expand the coverage of domains as well as improve the detection accuracy of the method, build a graph based on these associations, and assess the maliciousness of unknown domains based on this graph. For example, a method may differentiate between dedicated hosting environments and public. Then, once the hosting environments have been differentiated, a new association scheme based on these differentiations may be employed. For example, two domains may be deemed associated if they share at least one dedicated IP address or share more than one public IP address from different hosting providers. Furthermore, the solution method may classify apex domains, a second-level domain that does not contain a subdomain part, as public or dedicated to provide further associations. For example, two domains may be associated if they are co-hosted and belong to the same dedicated apex domain or share more than one public IP address from different hosting providers. Once these associations have been identified and graphed, an inference-based algorithm may be deployed. For example, a belief propagation algorithm may be utilized to analyze the graph. Such a method allows malicious domain assessment to be performed with improved accuracy and efficiency as compared to prior solutions.

FIG. 1 depicts a system 100 according to an exemplary embodiment of the present disclosure. The system 100 includes the DNS data 104, the domain-IP data 106, and the domain assessment system 102. The DNS data 104 may include a domains list 108. For example, the domains list 108 may include a list of domains to be assessed, and may further comprise corresponding resolving IP addresses 114 for each of the domains included on the domains list 108.

The domain-IP data 106 may include data stored on the Internet, a local storage device, or any form of information retrieved from a location external to the domain assessment system 102. The domain-IP data 106 may include passive DNS lists 116. The DNS lists 116 may include information on a corresponding apex domain 112 and hosting provider 110 for each entry on the DNS list. Though in this example fig., the domain-IP data 106 is separate from that of the domain assessment system 102 and DNS data 104, in another example, the domain-IP data 106 may be located within the DNS Data 104 or the domain assessment system 102.

The domain assessment system 102 may include a data receiver 120, a CPU 124, memory 126, and machine learning module 128. The data receiver 120 may be configured to receive data from the DNS data 104 and domain-IP data 106, and relay the information the necessary component. In some examples, the data receiver may be configured to provide data to the machine learning module 128. In this example, the data provided may comprise a plurality of domains and a plurality of IP addresses. Though in the current example, the data receiver 120 is separate from the machine learning module 128, in another example, it may be included as a component in the machine learning module 128. In yet another example, the data receiver 120 may be included in the CPU 124. The CPU 124 and memory 126 may implement one or more of the domain assessment system 102 features, such as the data receiver 120 and or the machine learning module 128. For example, the memory 126 may constructions which, when executed by the CPU 124, may perform one or more functions of the domain assessment system 102.

The machine learning module 128 may be configured to include a classification module 130, an association module 132, a graph-building module 134, and an assessment module 136. The classification module 130 may be configured to include an IP address classifier 140 and an apex domain classifier 142. The IP address classifier 140 may be configured to classify each of a plurality of IP addresses within the data provided to it based on the plurality of attributes. For example, the IP address classifier 140 may classify the resolving IP addresses 114 in the DNS Data 104 as public or dedicated, wherein a public IP address is defined as an IP address that is used for hosting domains from different entities and a dedicated IP address is defined as an IP address that is exclusively used to host domains of the same entity. In this example, the IP address classifier was previously trained based on a ground truth consisting of both known dedicated IP addresses and public IP addresses. This ground truth makes use of 11 selected IP address classification attributes for IP address classification, seen in Table 1 below.

TABLE 1

| Attributes Set | # | Attributes Name for IP address |
|---|---|---|
| Domain based attributes | 1 | # of FQDNs |
| | 2 | # of third level domains |
| | 3 | Mean duration |
| | 4 | Standard deviation of duration |
| IP block based attributes | 5 | # of IP addresses in its/24 IP address block |
| | 6 | # of second level domains in its/24 IP address block |
| | 7 | # of third level domains in its/24 IP address block |
| | 8 | Entropy of IP addresses in its/24 IP address block |
| Query based attributes | 9 | Average number of daily queries for IP address |
| | 10 | Mean number of DNS lookup queries per domain |
| | 11 | Standard deviation of the number of DNS lookup queries per domain |

As seen in Table 1, the IP address classifier 140 may be trained based on a selection of three attribute sets, collectively including the 11 selected IP address classification attributes. The first attributes set may be domain based attributes. These domain based attributes may include the number of fully qualified domain names ("FQDNs"), the number of third level domains which an IP address hosts during a certain time period, the mean duration of a domain hosted on an IP address, and the standard deviation of the duration of a domain hosted on the IP address. An example FQDN may be www.for.example.com whereas an example third level domain may be for.example.com. An example of a certain time period used within the third level domain attribute may be one week. These attributes capture statistics about the domains with which a particular IP address is associated. For example, if the mean duration is relatively long, the IP address may be a dedicated IP address due to domains hosted on dedicated IP addresses typically spending more time at that same IP address as compared to domains hosted on public IP addresses.

Another set of attributes used by the IP address classifier 140 may include an IP address block based attribute set. In an example, the attributes comprise the number of IP addresses in /24-subnet, the number of second level domains in /24 subnet, the number of third level domains in /24- subnet, and the entropy of IP addresses in the /24-subnet. For example, if the hosting patterns of the /24-subnets appear more uniform, it may be more likely that the IP addresses within the subnet are dedicated as public IP addresses may have more erratic hosting patterns.

Another set of attributes used by the IP address classifier 140 may include a query based attribute set. In the example, the attributes may comprise the average number of daily queries for the IP address, the mean number of DNS lookup queries for each domain on the given IP address, and the standard deviation of the number of DNS lookup queries per domain. For example, if the query counts for an IP address exhibits larger variation per hosted domain, it may be more likely that the queried domain is a public IP address, rather than a dedicated IP address that may typically experience less variation.

Based on these example attributes, the IP address classifier 140 may be configured to employ a classification algorithm to identify the resolving IP addresses 114 as public or dedicated. For example, a random forest classification algorithm may be used. In this example, the random forest classifier uses the aforementioned 11 attributes as a seed to build the model. In other examples, the IP address classifier 140 may employ decision trees, a support vector machine, or linear regression to classify the resolving IP addresses 114.

The apex domain classifier 142 may be configured to classify apex domains provided to it based on the plurality of attributes. For example, the apex domain classifier 142 may classify the apex domains 112 in the domain-IP data 106 as public or dedicated wherein a public apex domain as those whose subdomains belong to different entities and a dedicated apex domain is defined as an apex domain whose subdomains belong to the same entity. In this example, the apex domain classifier 142 was previously trained based on a ground truth consisting of both known dedicated apex domains and public apex domains. This example ground truth makes use of 15 selected DNS attributes for apex domain classification, seen in Table 2 below.

TABLE 2

| Attribute Set | # | Attribute Description |
|---|---|---|
| Domain based attributes | 1 | Dom_Sim - Subdomain Similarity |
| | 2 | Std_FQDN - Standard Deviation # FQDNs |
| | 3 | Avg_gTLD - Average gTLD |
| | 4 | Std_gTLD - Standard Deviation gTLD |
| | 5 | Ent - Subdomain entropy |
| | 6 | Pop - Popular subdomains |
| | 7 | Pop_Per_IP - Popular subdomains per IP address |
| IP address based attributes | 8 | IP_Sim - IP address similarity |
| | 9 | Avg_IP - Average # IP address |
| | 10 | Std_IP - Standard deviation # IP address |
| | 11 | Subnet - # 24 subnets |
| Query based attributes | 12 | Avg_Q - Average # queries |
| | 13 | Std_Q - Standard deviation # queries |
| Hosting based attributes | 14 | Avg_Dur - Average hosting duration |
| | 15 | Std_Dur - Standard deviation hosting duration |

As seen in Table 2, the apex domain classifier 142 may be trained based on a selection of four attribute sets, collectively including an example 15 selected domain classification attributes. The first attributes set may be domain based attributes. These domain based attributes may include the Dom_Sim, or subdomain similarity between the subdomains of the same apex domain. For example, the subdomain similarity may be represented as the average Jaccard similarity. For example, if the average Jaccard similarity identifies that the subdomains exhibit similar patterns, it may be likely the apex domain controls the subdomains, signifying a dedicated apex domain. A second attribute, the standard deviation of the FQDNs represents a measured standard deviation of the number of domains belonging to the same apex domain each day. For example, if the standard deviation were relatively small, the number of domains would appear to be more stable over time, implying a dedicated apex domain. A third and fourth example attribute may comprise the averaged presence of generic third level domains present in the subdomain part of each domain over time and the standard deviation in that presence. In an example, public apex domains frequently use their FQDN as the subdomain part and therefore have higher averages and standard deviations of generic third level domains as compared to those of private apex domains. A fifth example attribute, as seen in Table 2, may include a value for the subdomain entropy, defined as the randomness of the subdomains of each apex. In an example, public apex domains typically have higher values of entropy as compared to that of dedicated apex domains. A sixth example attribute is the average number of top frequently seen subdomains for an apex domain over time. In another example, it is typical that the top frequently seen subdomains are more likely to be part of a dedicated apex domain compared to public apex domains. A seventh example attribute is the average number of popular subdomains belonging to a given apex domain over each resolved IP address during the measurement period.

Another set of attributes used by the apex domain classifier 142 may include an IP address based attribute set. In an example, the attributes comprise a value for the measured Jaccard similarity of the IP addresses hosting all domains of each apex domain. Other attributes in an example set of IP address based attribute set comprises the average and standard deviation of the number of IP addresses on which domains belonging to each apex domain resolve to during certain intervals throughout a measurement period. For example, the certain interval may be a day and the measurement period may represent one week, providing an average number of IP addresses to which apex domains resolved each day over that one week. Another example attribute of an IP address based attribute set may comprise a calculated subnet value, which represents the number of 24-subnets in which IP addresses host domains of each domain apex. In an example, public apex domains are hosted in many different 24-subnets whereas dedicated apex domains are hosted in relatively fewer 24-subnets.

Another set of attributes used by the apex domain classifier 142 may include a query based attribute set. In an example, the attributes may comprise the average number of daily DNS lookup queries issued to all domains belonging to each apex domain, and the standard deviation of the number of DNS lookup queries for each apex domain. For example, if the query counts for an IP address exhibits larger variation per hosted domain, it may be more likely that the queried apex domain is a public apex, rather than a dedicated apex domain that may typically experience less variation due to a stable user base.

Another set of attributes used by the apex domain classifier 142 may include a hosting based attributes set. In an example, the examples in this set may comprise average and standard deviation of the duration in which each domain is hosted in the set of IP addresses it resolves to during the measurement period. For example, domains from dedicated apex domains are typically hosted in a given IP address for relatively longer period, with a stable rotation of IP addresses, as compared to domains from a public apex domain.

Based on these example attributes, the apex domain classifier 142 may be configured to employ a classification algorithm to identify each of the apex domains 112 as public or dedicated. For example, a random forest classification algorithm may be used. In this example, the random forest classifier uses the aforementioned 15 example attributes as a seed to build the model. In other examples, the apex domain classifier 142 may employ decision trees, a support vector machine, or linear regression to classify the apex domains.

The machine learning module 128 may be further configured to include an association module 132. This association module 132 may be configured to associate each of the plurality of domains on the domain list 108 and the resolving IP addresses 114 found within the DNS data 104 on at least the corresponding associations, determining a plurality of domain associations 144. For example, the association module 132 may associate domains from the domain list 108 based on the associations each domain has with any of the plurality of resolving IP addresses 114 that have been classified as public or dedicated. In an example, two domains may be associated if they share either at least one dedicated IP address or share more than one public IP address from more than one hosting provider. In another example, the association module 132 may associate domains from the domain list 108 based on their corresponding relationship with any apex domains 112 that have been classified as public or dedicated. In an example, two domains may be associate if they are co-hosted dedicated domains and belong to the same apex domain or share more than one public IP address from more than one hosting provider. In yet another example, the association module 132 may associate domains based on both previous examples by associating two domains if they share either at least one dedicated IP address, share more than one public IP address from more than one hosting provider, or are co-hosted dedicated domains that belong to the same apex domain 112.

The domain assessment system 102 may be configured to include a graph-building module 134. The graph-building module 134 may be configured to build a weighted domain graph 146 based on the classifications and domain associations 144. For example, when building a graph based on associated IP addresses, the association weight between two domains $d_1$ and $d_2$, $w(d_1, d2)$, may be calculated using equation 1 and equation 2, below. Given a pair of domains $d_1$ and $d_2$ that share a set I of resolving IP addresses 114, let $IP_d$ denote the set of resolved dedicated IP addresses in I, $IP_u$ is the set of resolved public IP addresses in I, while hosting $(IP_u)$ denotes the set of hosting providers to which the resolved public IP addresses in I belong.

$$w(d_1, d_2) = \begin{cases} 1 - \frac{1}{n+1}; & \text{if } d_1 \neq d_2 \\ 1; & \text{if } d_1 = d_2 \end{cases} \quad \text{Equation 1}$$

where $n = 2|IP_d| + |\text{hosting}(IP_u)| - 1$      Equation 2

Through an example use of the above Equation 1, the domain assessment system captures four conclusions: (1) A minimum of either one dedicated IP address or two common hosting providers are required to establish an association, (2) sharing a dedicated IP address is stronger than sharing hosting providers, (3) the more the number of hosting providers and dedicated IP addresses are, the stronger the association, and (4) the number of hosting providers and dedicated IP addresses set has a diminishing return of strength.

In another example, the graph-building module 134 may be configured to assign weights based on associated apex domains according to a combination of Equation 1, above, and Equation 3 and 4, below. As can be derived from the below Equation 3, if two domains both belong to the same dedicated apex domain, they are assigned a weight of 1 as they are very likely controlled by the same entity no matter the number of nested subdomains in each domain.

$$s(d_1, d_2) = \begin{cases} 1 & \text{if } d_1 \text{ and } d_2 \text{ belong to the same dedicated apex domain} \\ 0 & \text{otherwise} \end{cases} \quad \text{Equation 3}$$

$$n = 3s(d_1, d_2) + |\text{hosting}(IP\_Set)| - 1 \quad \text{Equation 4}$$

In yet another example, the graph-building module 134 may be configured to assign weights to domain associations 144 based on both associated IP addresses and associated apex domains. In an example, the graph-building module 134 is configured to assign weights to domain associations based on a combination of each of the above Equations 1-4.

The domain assessment system 102 may be further configured to include an assessment module 136. The assessment module 136 may be configured to assess the maliciousness of a domain based on a weighted domain graph. For example, once the graph-building module 134 has completed building a graph detailing weights and relations between the domains of the domain list 108, the assessment module 136 may employ a belief propagation algorithm to determine a likelihood that a specific domain may be malicious. In another example, the assessment module 136 may employ a path-based inference algorithm to determine the likelihood that a specific domain may be malicious.

Figure 2:
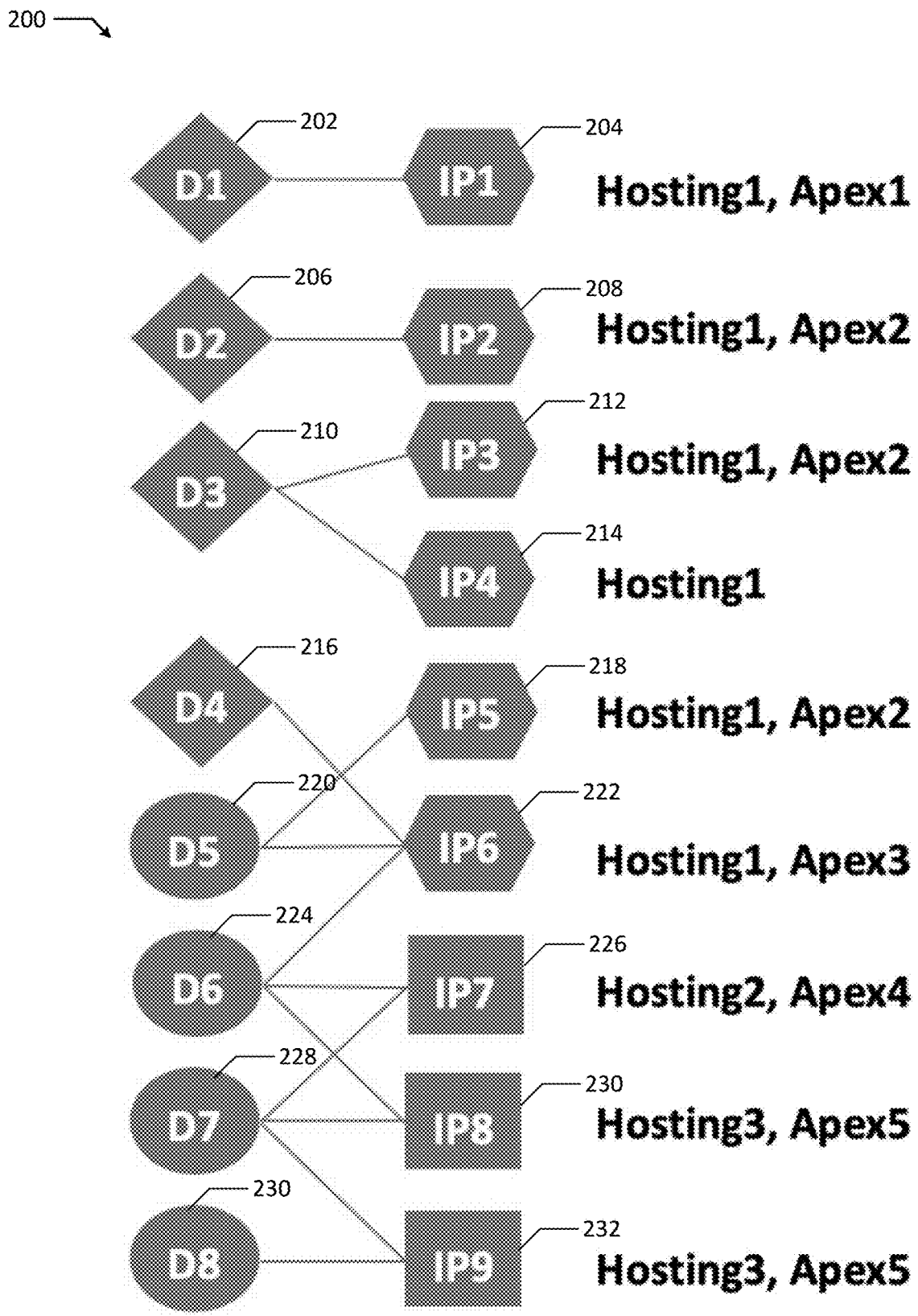
FIG. 2 illustrates an example IP address and domain graph.

FIG. 2 illustrates an example IP address and domain graph 200. In this graph 200, there are eight domains 202, 206, 210, 216, 220, 224, 228, and 230, 9 IP addresses 204, 208, 212, 214, 218, 222, 226, 230, and 232. In this fig., the classification module 130 has already classified each of the IP addresses and apex domains as public or dedicated, for example, by way of an IP address classifier 140 and apex domain classifier 142. In this case, IP1 204, IP2 208, IP3 212, IP4 214, IP5 218 and IP6 222 have been classified as dedicated IP addresses, whereas IP7 226, IP8 230, and IP9 232 have been classified as public IP addresses. Furthermore, Apex 1 and Apex 2 have been classified as dedicated apex domains whereas apex 3, apex 4, and apex 5 have been classified as public apex domains. Each domain in the graph 200 belongs to an apex domain. For example, D1 202 belongs to the apex domain 1 and D2 206 belongs to the apex domain 2. Furthermore, each IP address belongs to a hosting provider. For example, IP1 204 belongs to hosting provider 1 and IP2 208 belongs to hosting provider 2. As can be seen in FIG. 2, a domain can be associated with more than one IP address or hosting provider. For example, D6 224 is associated with IP6 222, IP7 226, IP8 230, and apex domain 4. The three IP addresses IP6 222, IP7 226, and IP8 230 belong to hosting1, hosting2, and hosting3, respectively.

Figure 3:
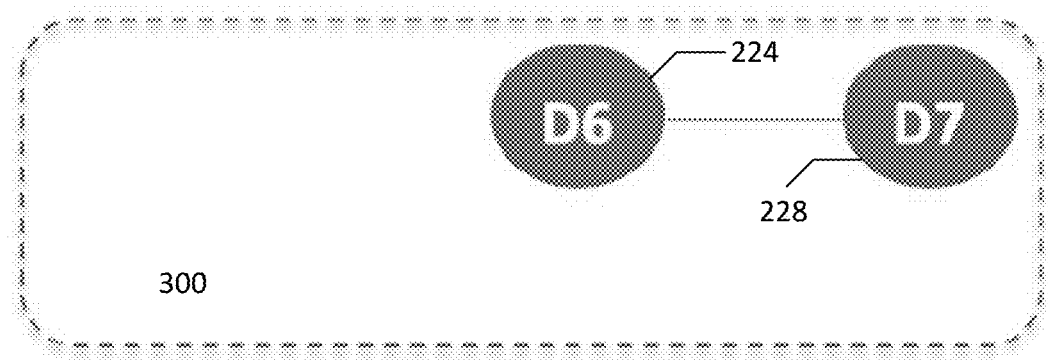
FIG. 3 illustrates an example graph built by the method of the present disclosure.

FIG. 3 illustrates an example graph 300 built by the method of the present disclosure based on the example IP address and domain graph 200. In an example method of the present disclosure, the association module 132 determined domain associations 144 by associating domains that both belong to the same at least two hosting providers, as performed by some prior solutions. In the example IP address and domain graph 200, only D6 224 and D7 228 illustrate this behavior, with each domain belonging to both hosting provider 2 and hosting provider 3, based on their resolving to IP7 226 and IP8, 230, respectively. This method association is referred to as G-Baseline within this disclosure. In this example, only two of the possible eight domains are associated, providing little information about the maliciousness of the domains of graph 200.

Figure 4:
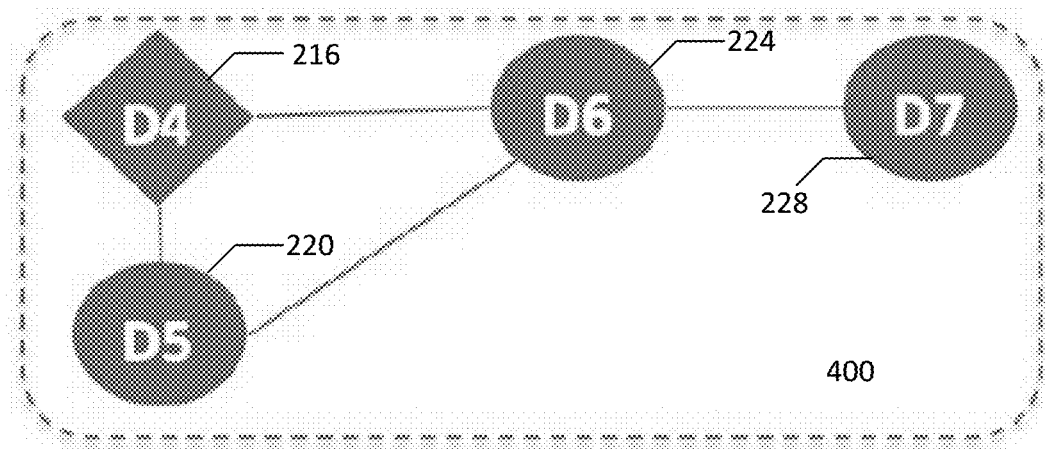
FIG. 4 illustrates an example graph built by the method of the present disclosure.

FIG. 4 illustrates an example graph 400 built by the method of the present disclosure based on the example IP address and domain graph 200. The graph 400 is expanded beyond the example graph 300 by implementing association rules according to the present disclosure. For example, the association module 132 has determined more domain associations 144 based on a dedicated IP address relationship. For example, the association module 132 deems two domains associated if they share at least on dedicated IP address. This association method is referred to as G-IP within this disclosure. In example graph 200, domains D4 216, D5 220, and D6 224 share the dedicated IP6 222. This association method combined with the association rules used to build graph 300, combine to produce the example graph 400, containing four of the eight domains found in the example IP address and domain graph 200, providing an expanded graph for maliciousness analysis.

Figure 5:
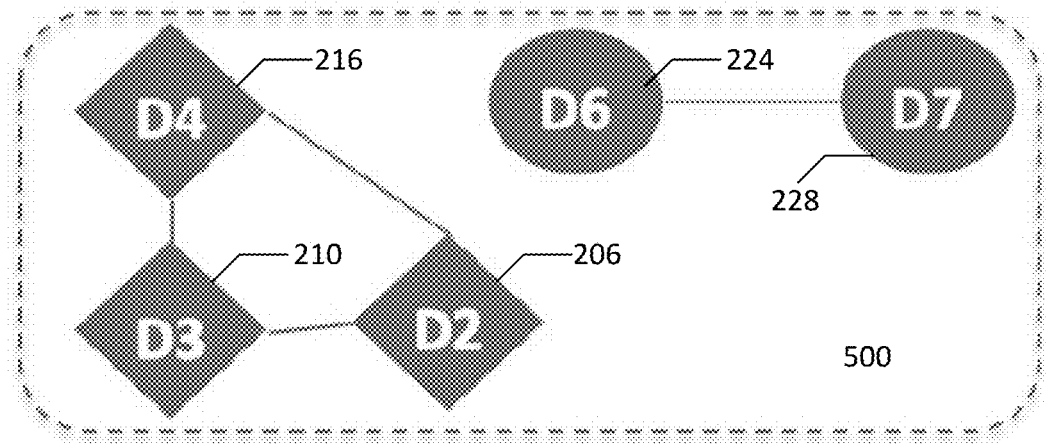
FIG. 5 illustrates an example graph built by the method of the present disclosure.

FIG. 5 illustrates an example graph 500 built by the method of the present disclosure based on the example IP address and domain graph 200. The graph 500 is expanded beyond the example graph 400 by implementing further association rules according to the present disclosure. For example, the association module 132 has determined more domain associations 144 based on a dedicated apex domain relationship. For example, the association module 132 deems two domains associated if they are co-hosted domains and belong to the same dedicated apex domain. This association method is referred to as G-Domain within this disclosure. Of the eight domains in the example IP address and domain graph 200, only domains D2 206, D3 210, and D4 216 qualify for this association. This association method combined with the association rules used to build graph 300, combine to produce the example graph 500, containing five of the eight domains found in the example IP address and domain graph 200, providing an expanded graph for maliciousness analysis.

Figure 6:
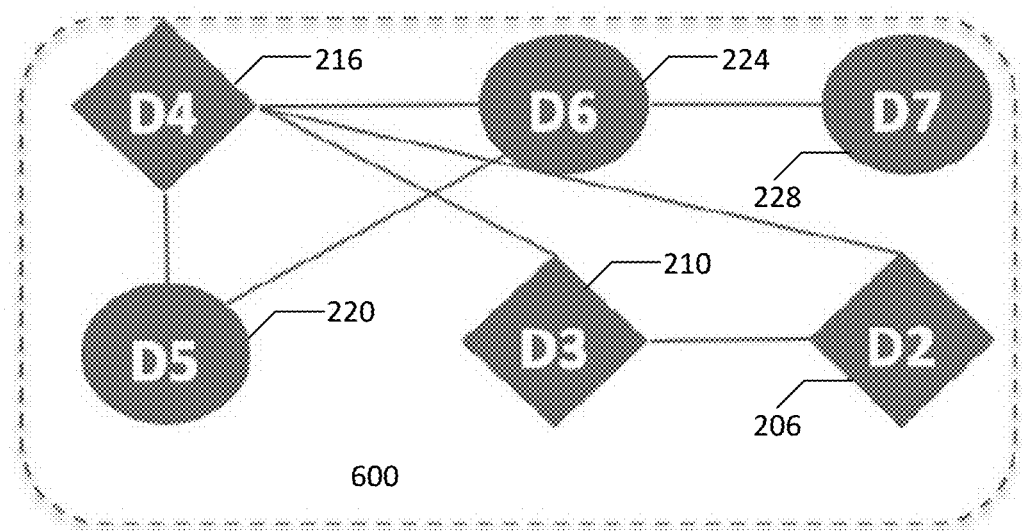
FIG. 6 illustrates an example graph built by the method of the present disclosure.

FIG. 6 illustrates an example graph 600 built by the method of the present disclosure based on the example IP address and domain graph 200. The graph 600 is expanded beyond the prior example graphs 300, 400, and 500 by implementing all association rules used to create these prior graphs. This association method is referred to as G-IP-Domain within this disclosure. This combination of association rules produces the example graph 600, containing six of the eight domains found in the example IP address and domain graph 200.

Figure 7:
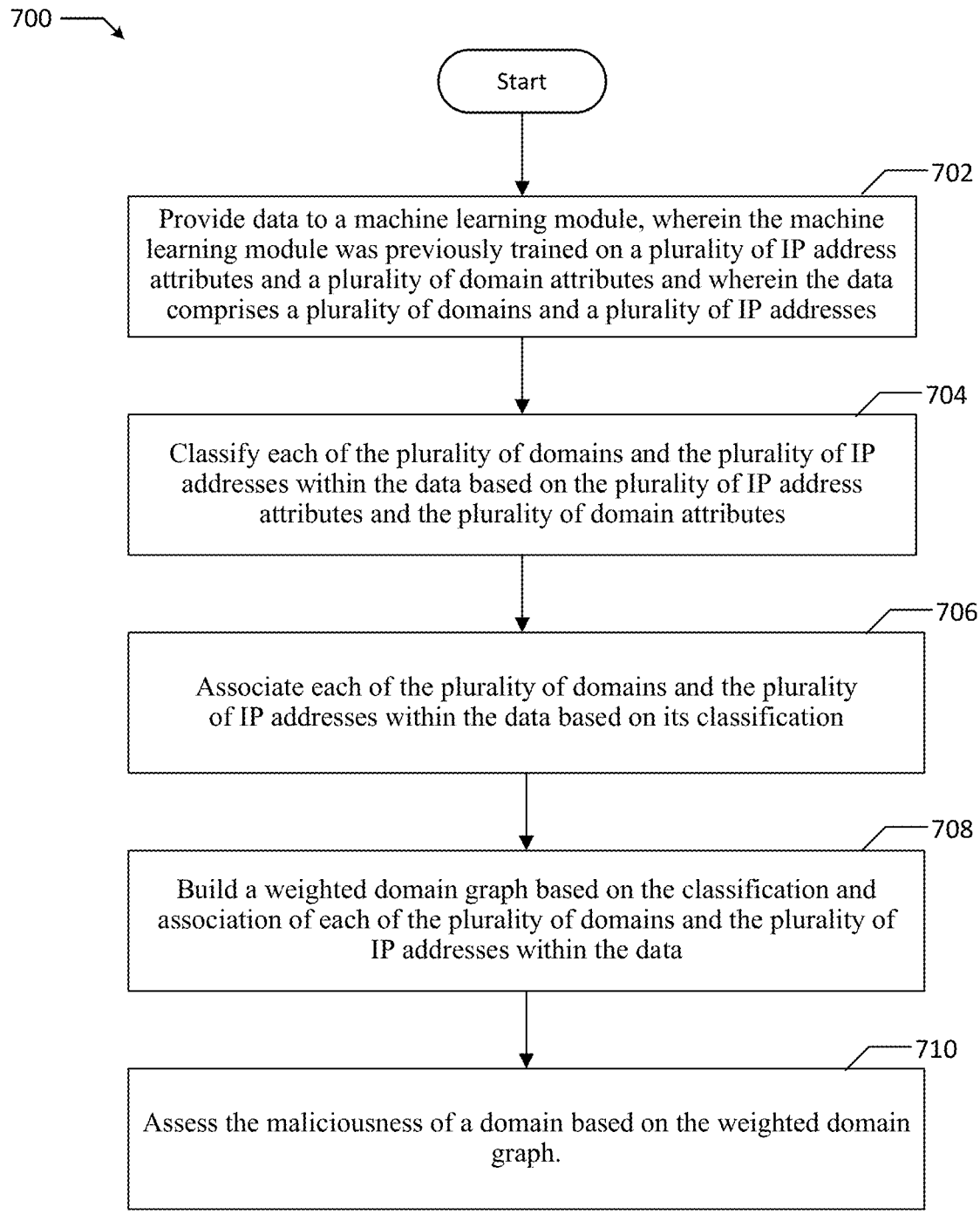
FIG. 7 illustrates an example embodiment of a method of the present disclosure.

FIG. 6 illustrates an example embodiment of a method 700 of the presently disclosed method, as was discussed above in relation to the system 100. The method 600 may be implemented in system, such as the system 100, or on a CPU. For example, the method may be implemented by the domain assessment system 102, classification module 130, the association module 132, the graph-building module 134, the assessment module 136, the IP address classifier 140, the apex domain classifier 142, or the CPU 124. The method 700 may also be implemented by a set of instructions stored on a computer readable medium that, when executed by a processor, cause the computer system to perform the method. For example, all or part of the method 700 may be implemented by the CPU 124 and memory 126. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

Block 702 includes providing data to a machine learning module, wherein the machine learning module was previously trained on a plurality of IP address attributes and a plurality of domain attributes and wherein the data comprises a plurality of domains and a plurality of IP addresses. For example, a domain assessment system 102 comprising a data receiver 120 may receive the DNS data 104 and provide the DNS data 104 to the machine learning module 128. Block 704 comprises classifying each of the plurality of domains and the plurality of IP addresses within the data based on the plurality of IP address attributes and the plurality of domain attributes. For example, the classification module 130 may comprise an IP address classifier 140 and an apex domain classifier 142 that uses a machine learning model to classify corresponding IP addresses and domains based on 11 IP address classification attributes and 15 domain classification attributes, respectively. At block 706, each of the plurality of domains and the plurality of IP addresses within the data are associated based on its classification. For example, the association module 132 may associate any two domains if they share a dedicated IP address, share one or more public IP address from more than one hosting provider, or are co-hosted dedicated domains belonging to the same apex domain. A weighted domain graph is built based on the classification and association of each of the plurality of domains and the plurality of IP addresses within the data at block 708. In addition, at block 710, the maliciousness of a domain is assessed based on the weighted domain graph. For example, an assessment module 136 may employ a random forest classification algorithm on a weighted domain graph 146 to assess the likelihood of maliciousness.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

Experimental Validation

This experiment was conducted to study the impact of the different types of associations on domain coverage and detection accuracy.

Input Dataset and Ground Truth Datasets

The experiments were performed on PDNS data collected by Farsight Security Inc. [Farsight Security, Inc. 2019], where they collected aggregate domain resolution information from 600 plus sensors placed all over the world. Resource records (RRs) were extracted from Nov. 1 2018 to Nov. 21 2018. In order to show that the approaches generalize to different dataset, another set of RRs from Jan. 15 2019 to Jan. 21 2019 were chosen as well. Each RR has the information mentioned in Table 3, below.

TABLE 3

| Field | Description |
|---|---|
| rrname | The name of the domain queried |
| rrtype | Type of RR such as A, AAAA, CNAME, NS, MX, etc. |
| rdata | A set of one or more IP addresses that the domain resolves to |
| bailwick | Apex domain name of the domain queried |
| time_first | The first time a given resolution is observed |
| time_last | The last time a given resolution is observed |
| count | The number of times the DNS query for the domain-IP resolution is seen during time_first and time_last |

Each record in the input dataset comprised a <domain, IP address> tuple of domain and its hosting IP addresses. Thus, the dataset was represented by a bipartite graph with domains on one side and IP addresses on the other. An edge was created for each <domain, IP address> tuple in the dataset. The bipartite graph was dubbed domain resolution graph. Though this experiment focused only on address (A) records (IPv4 addresses), one may easily extend the experiment to include AAAA records (IPv6 address) as the algorithms and protocols proposed are not specific to only IPv4 addresses. In fact, the techniques could be directly applied to other network graphs such as CNAME based association graph with little modification as well. From A records, a subset of resolutions that are first seen on a given day were identified. Domains with long-term malicious activities were likely to be identified and blocked or taken down. Therefore, in general, long-lived domains were likely to be benign. Even though sometimes such benign domains may be compromised, their administrators eventually clean and regain control of them. Thus, the focus of our analysis was on new domain-IP resolutions that were first observed on a given day.

Figure 8A:
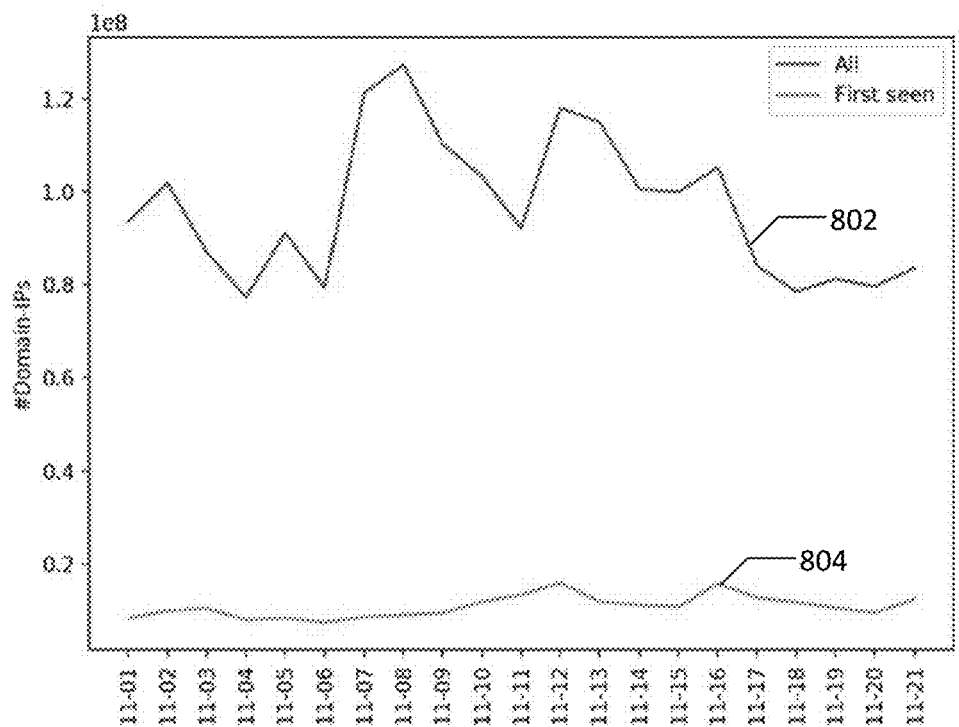
FIGS. 8A and 8B illustrate the results of experimental validation of a method of the present disclosure.
Figure 8B:
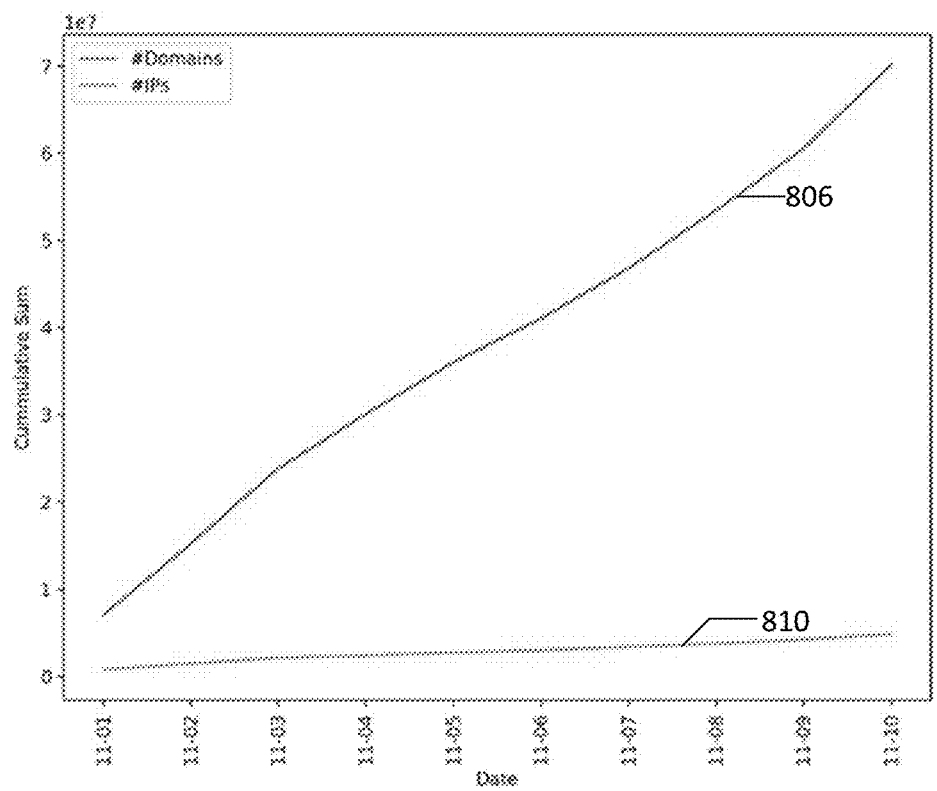

FIG. 8A shows the number of unique resolutions 802 as well as first observed unique resolutions 804 for the experiment time duration of the first three weeks of November 2018. On average, less than 10% of domain-IP resolutions occurred for the first time with respect to all domain-IP resolutions gathered since 2011. FIG. 8B shows the cumulative sum of domains and IP addresses from the first observed dataset. It shows that the growth of new Domains 806 or IP addresses 810 over time was roughly linear but slow.

Benign ground truth was collected from Alexa top 1 m list, which was published daily. Alexa top list reflects the popularity of domains on a given day. Although malicious domains sometimes made it to the top Alexa domains, Alexa lists have been generally used in previous work as a source of benign domains. In order to minimize the number of malicious domains appearing in the Alexa top list and resulting in incorrect false positives, it was a common practice to consider Alexa top domains consistently appearing in the top list over a period of time, usually one year. In this work, Alexa top domains for each day from Nov. 1, 2018 to Nov. 21 2018 that consistently appeared throughout one-year period were collected.

Malicious ground truth was collected from VT [VirusTotal, Subsidiary of Google 2019], a Google-based state-of-the-art service that provided a public querying facility to obtain intelligence on any URL by analyzing around 65-70 third-party scanners and URL/domain blacklisting services, including Google Safe Browsing (GSB), COMODO site inspector, phishtank and many others. Each tool in VT categorized a URL as clean, malicious, phishing or malware. VT provided a rate limited public API to check the status of URLs programmatically. Additionally, every hour, VT published a feed of URLs along with aggregated intelligence for the URLs queried by Internet users all around the world during the previous hour. However, there were challenges related to the intelligence reported by VT. For example, GSB and phishtank results in VT were not always consistent with their direct results and different tools provide conflicting labels such as phishing and malware for a given URL. For this experiment, malicious domains there were flagged by at least two engines in VT from Nov. 1, 2018 to Nov. 21, 2018 were collected.

Empirical Evaluation

Extensive sets of experiments to infer malicious domains were conducted by applying the path-based and BP algorithms over the four domain graphs 300, 400, 500, and 600. The experiment implemented the path-based inference and BP algorithms with Apache Hadoop and Giraph, running on a cluster with 27 nodes, each having two cores. When computing true positive rate (TPR) and false positive rate (FPR), ten-fold cross validation was used. The malicious ground truth was randomly divided into ten folds and performed 10 round executions of the inference algorithm. In each round, one different fold was picked up as test set and the remaining nine folds as training set. The ten-fold testing was repeated 5 times using different random divisions of the malicious ground truth each time, which gave a total of 50 execution rounds of the inference algorithm. For each round, the TPR and the FPR were computed for various threshold values (malicious threshold). For each malicious value, the TPR was computed as the percentage of malicious domains in the malicious test set with scores above malicious threshold. The FPR was computed as the percentage of domains in the benign ground truth with scores above the malicious threshold. The malicious threshold was varied between 0 and 1 with 0.01 steps. The TPR and FPR were reported for each malicious threshold value as the average over the values in the fifty rounds.

Intuitively, web-hosting services, cloud providers and content delivery network (CDN) may have hosted many unrelated domains under one or several IP addresses. For example, two domains hosted by the same IP address in Amazon Web Service (AWS) (or CloudFlare, Akamai) could have belonged to different owners. One domain being malicious did not imply that the other one was likely to be malicious. An efficient heuristic approach to fix this problem was to exclude the "popular" IP addresses, which hosted more than t domains in a certain period, from the domain resolved data. This limit was set to 1500, where a given IP address hosted 1500 or more hosts. It should be noted that this was a very small percentage (less than 1%) of the total IP addresses seen in the original dataset.

In this experiment, the window size in terms of days for multiple approaches was varied to be from 1 day to 14 days and the experimental method was performed for each window size multiple times for randomly selected dates from the study period of the first three weeks of November 2018.

Figure 9A:
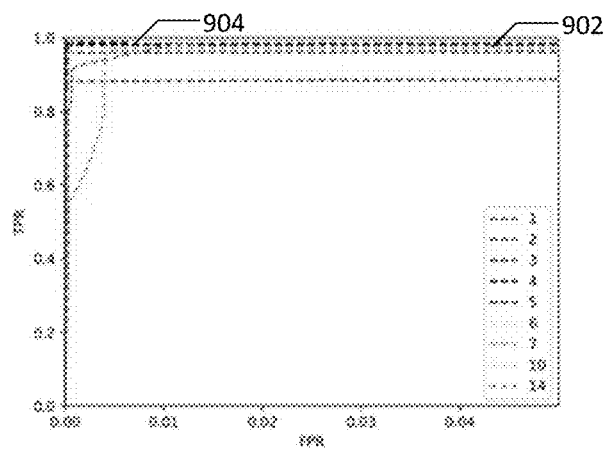
FIGS. 9A-9D illustrate the results of experimental validation of a method of the present disclosure.
Figure 9B:
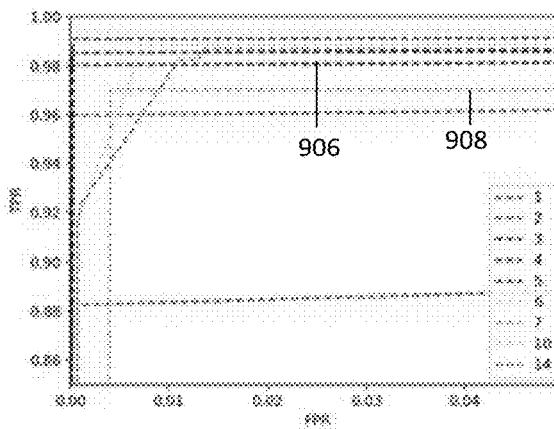
Figure 9C:
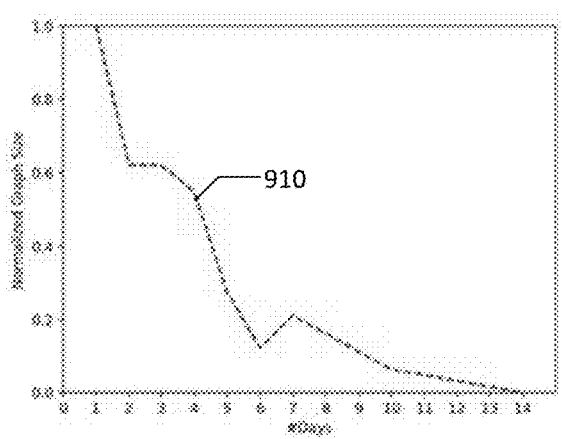
Figure 9D:
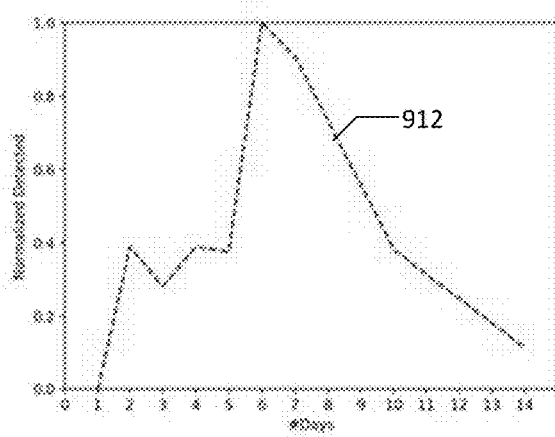

FIGS. 9A-D shows the window size experiments carried out for G-Baseline approach (Approach of FIG. 3). FIGS. 9A and 9B show the average ROC curves for different days. The figures show that the best accuracy in terms of TPRs and FPRs was achieved when the window size is between 3 and 7 days represented by line 3 904 and line 7 902 in FIG. 9A and line 3 906 and line 7 908 in FIG. 9B. FIG. 9C shows the normalized number of domains in domain graphs with respect to the size of the average domain-IP resolution graphs for each window represented by line 910. It shows that with the increased window size, the percentage of domains that can be associated to create G-Baseline domain graphs reduced. In other words, there was a diminishing domain graph size compared to domain-IP resolution graph considered. This result was consistent with the following observations. The size of the domain-IP resolution graph increased when the window size increased as roughly 1 million unique new domain-IP pairs per day were observed (FIG. 8A). However, the number of new domains and IP addresses seen overtime only increased very slowly (FIG. 8B). The two observations together resulted in diminishing the number of domains added to the domain graph with an increasing number of days. FIG. 9D shows the normalized number of detected malicious domains with respect to the size of the domain-IP resolution graph under consideration, represented by line 912. It shows that the normalized ratio increased until the 7 day window and then started to decrease with an increased window size. Domains that changed hosting providers frequently did so within 7 days and subsequent changes did not expand the domain graph. Having considered all the above measurements, a 7 day window was optimal for G-baseline graphs that resulted in high accuracy and large coverage.

Figure 10A:
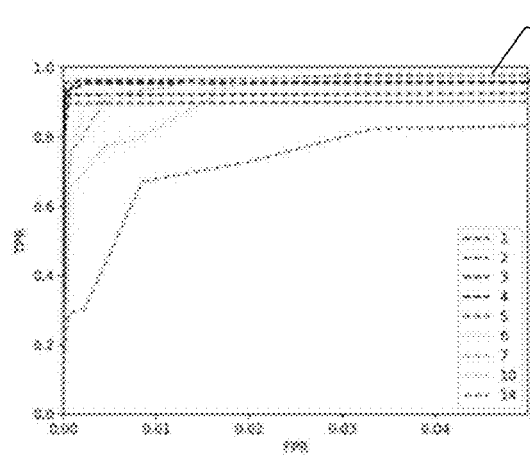
FIGS. 10A-10D illustrate the results of experimental validation of a method of the present disclosure.
Figure 10B:
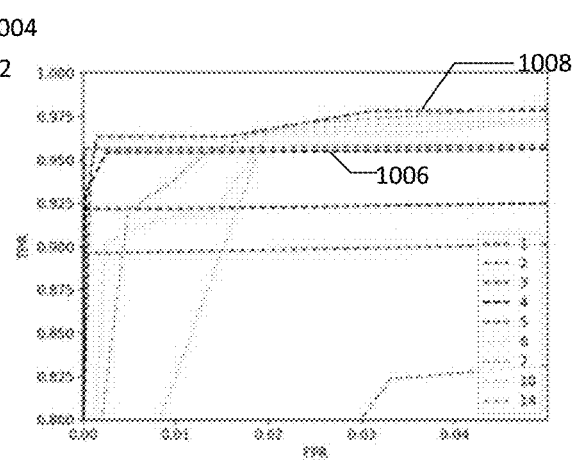
Figure 10C:
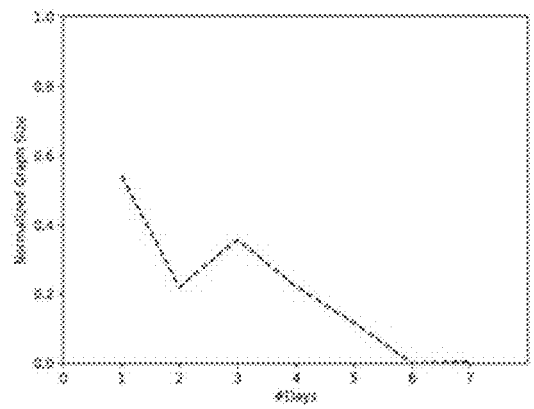
Figure 10D:
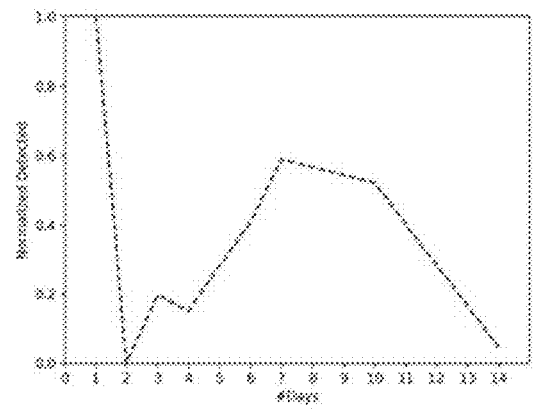

The same experiments carried out above were carried out for the G-IP algorithm (the association rules used to determine FIG. 4). FIG. 10 shows the window size experiments for FIG. 4 approach. The results were quite consistent with the measurements from the G-baseline algorithm. As FIGS. 10A and 10B show, the best ROC for G-IP algorithm was observed during the windows from 4 to 7 days represented by line 1002 and line 1004 in FIG. 10A and line 1006 and line 1008 in FIG. 10B, respectively. Similar trends in the normalized domain graph size were observed with respect to domain-IP resolution graphs (FIG. 10C) and the normalized detected malicious domains with respect to the domain-IP resolution graphs (FIG. 10D). The spike at day 1 of FIG. 10D of the normalized detected domains experiment was due to the reason that most of the associations for the dedicated IP address rule were identified in day 1 and the set of such domains remained fairly stable afterwards. Thus, the optimal window size of G-IP was 7 days, the same as that for G-Baseline as seen in FIG. 9A.

Figure 11A:
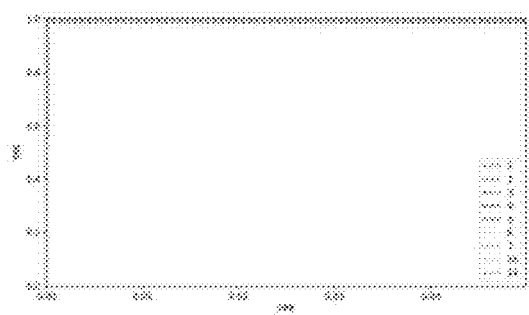
FIGS. 11A-11D illustrate the results of experimental validation of a method of the present disclosure.
Figure 11B:
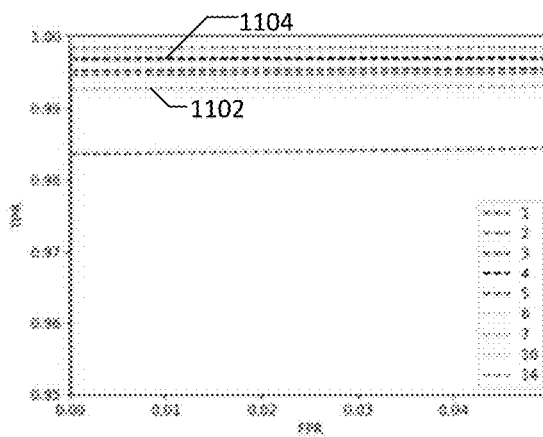
Figure 11C:
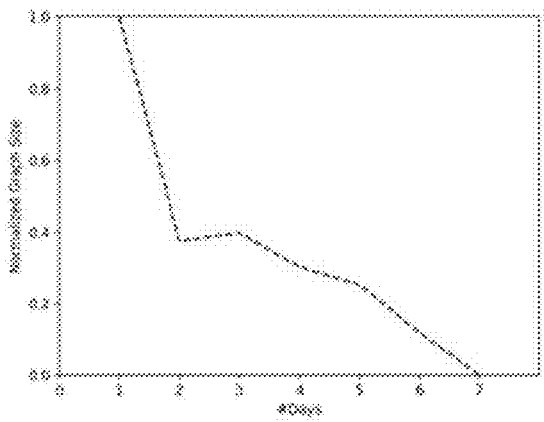
Figure 11D:
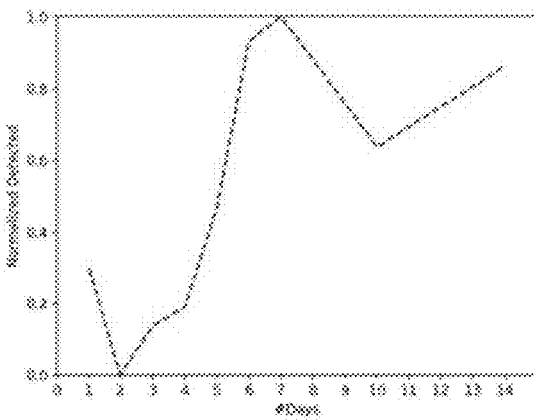

Similar patterns with G-Domain algorithm were observed for different window sizes compared to G-Baseline and G-IP algorithms. A key reason for similar patterns was that all three algorithms link domains that were highly likely to be associated with one another compared to unreliable association rules such as co-IP relationships. Another reason was that G-IP and G-Domain algorithms were built upon the G-Baseline approach such that the original associations were preserved while new strong associations were added. These results can be seen in FIGS. 11A-D. In FIG. 11B, a seven day window is represented by line 1102 and the three day window is represented by the line 1104, with all lines remaining above 99%.

From the above three sets of experiments, it can be determined that that in order to maximize for AUC, and the number of detected malicious domains, it was best to use a 7 day window. For the subsequent experiments, the window size was fixed at 7 days. The November 2018 dataset was broken into three sets as (week 1) Nov. 1, 2018-Nov. 7, 2018, (week 2) Nov. 8, 2018-Nov. 14, 2018, and (week 3) Nov. 15, 2018 to Nov. 21, 2018. Table 4, below, provides a summary of the three datasets and the January 2019 one week dataset, and shows that the statistics across weeks were quite consistent.

| Dataset | Summary Statistics | | |
| --- | --- | --- | --- |
| | #Domain-IP addresses | #Domains | #IP addresses |
| week-1 (Nov. 1-7, 2018) | 62,023,109 | 46,899,543 | 3,428,331 |
| week-2 (Nov. 8-14, 2018) | 83,492,111 | 67,990,890 | 3,423,881 |
| week-3 (Nov. 15-21, 2018) | 84,366,542 | 67,275,385 | 3,327,941 |
| week-4 (Jan. 15-21, 2019) | 58,420,085 | 43,720,702 | 3,008,337 |

Figure 12A:
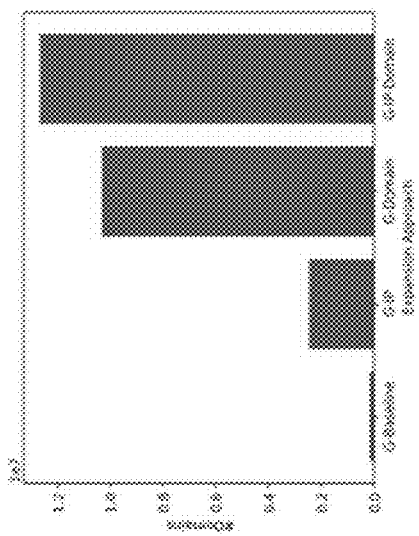
FIGS. 12A-12C illustrate the results of experimental validation of a method of the present disclosure.
Figure 12B:
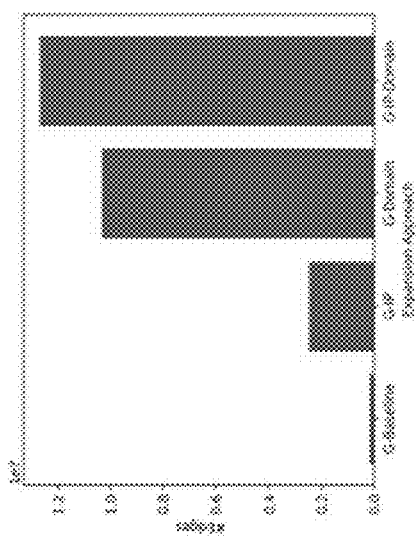
Figure 12C:
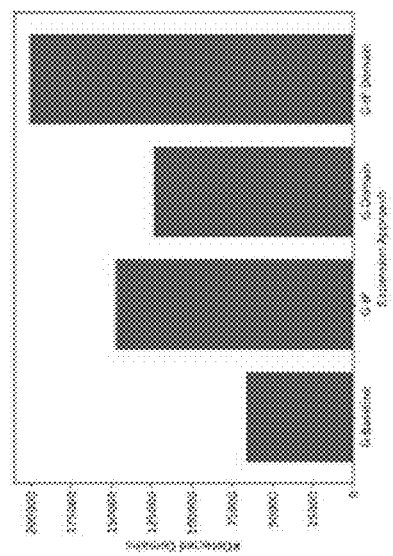

The average size of the domain graph built for the three different types of algorithms, G-Baseline, G-IP and G-Domain, were taken over three different optimal window size of 7 days mentioned earlier. FIGS. 12A-C show the average size of the domain graphs constructed. FIG. 12A shows the average number of domains. FIG. 12B shows the average number of edges. FIG. 12C shows the average number of detected domains. It is not surprising that G-IP and G-Domain graphs were bigger than G-Baseline as these two graphs utilized the same association rule as G-Baseline in addition to new association rules. What was commendable about the new association was the order of magnitude bigger expansions compared to the size of the G-Baseline domain graph. The G-IP domain graph was roughly 15× bigger than the G-Baseline domain graph. Further, the G-Domain graph was roughly 60× and 4× bigger than the G-Baseline and the G-IP domain graphs, respectively. These results show that the two new association algorithms in general were quite effective in identifying meaningful associations, resulting in much bigger graphs compared to G-Baseline graphs. The fact that G-Domain graphs were by far the largest graphs indicated that many domains in the wild belong to dedicated apex domains. FIG. 12A shows that the G-Domain associations provided even larger domain coverage compared to the G-IP association. This was likely due to the fact that most of the domains in the wild had many hosts (subdomains) that belonged to the same apex domain compared to domains on dedicated IP addresses.

FIGS. 13A-D show the ROC curves of the true positive rate and the false positive rate on the three domain graphs for the three different weeks. The ROC curve for each approach for the three different weeks were compared and the average ROC curve for all approaches together was compared.

Figure 13A:
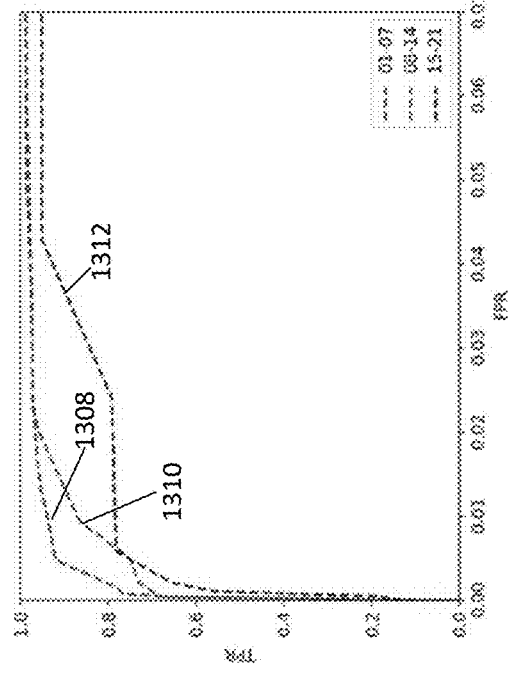
FIGS. 13A-13D illustrate the results of experimental validation of a method of the present disclosure.
Figure 13B:
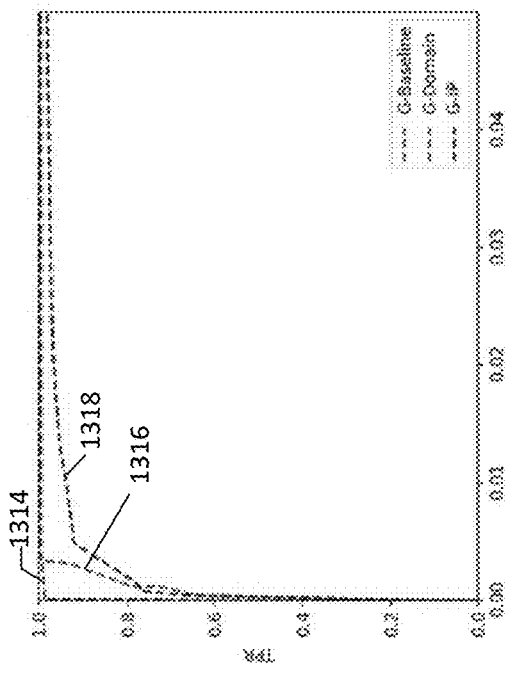
Figure 13C:
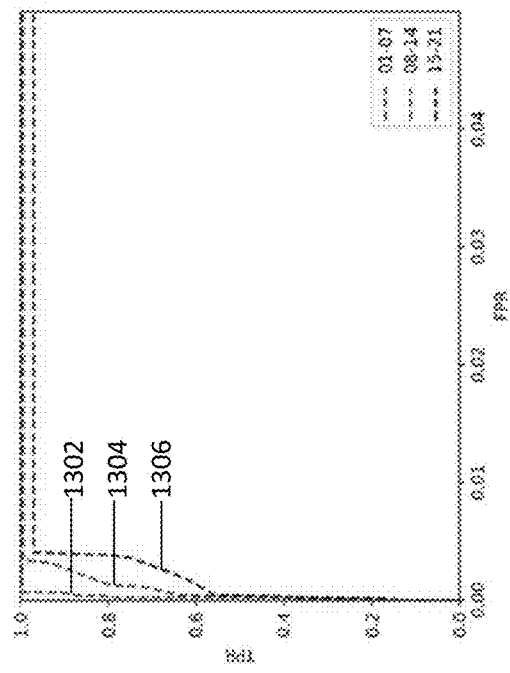

FIG. 13A shows the ROC curves for G-Baseline for the three different weeks with lines 1302, 1304, and 1306 representing the first week, second week, and third week, respectively. In general, it provided a very high accuracy with an AUC close to 1. For the three experiments, over 99% TPR was achieved with a very small FPR less than 0.6%. FIG. 13B shows the ROC curves for G-IP for the three different weeks with lines 1308, 1310, and 1312 representing the first week, second week, and third week, respectively. Over 98% TPR for a small FPR ranging from 2% to 4% was achieved. FIG. 13C shows the ROC curves for G-Domain for the three different weeks with each line similar enough to be nearly indistinguishable. A very high TPR over 99.5% with a very small FPR less than 0.2% was achieved.

Figure 13D:
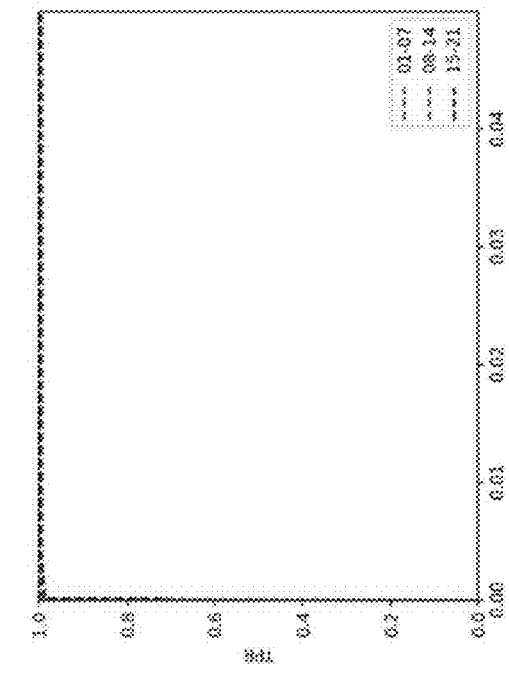

FIG. 13D compares the average ROC curves for the three approaches, G-Baseline curve 1316, G-IP curve 1318 and G-Domain curve 1314. In general, G-Domain detected malicious domains with the highest accuracy compared to G-IP and G-Baseline. G-Baseline provided slightly better detection accuracy compared to G-IP. The improvement in the detection accuracy in G-Domain was mainly due to the fact that Internet miscreants created many subdomains in a short time period to launch their attacks as it was much easier to create subdomains rather than apex domains. Given a dedicated apex domain or a subdomain belonging to this apex domain, if it was known or inferred to be malicious, it was highly likely all subdomains under this apex domain were malicious. As a result of these two facts, G-Domain was not only able to detect malicious domains with high accuracy, but also expanded the domain coverage considerably as mentioned above. It should be noted that even G-IP detected malicious domains with high accuracy and expanded the domain graph considerably with respect G-Baseline.

One possible reason why G-IP on average recorded a slightly less accuracy compared to other approaches is that the IP address classifier was trained for the 1st week of November 2018 and used with all three weeks. As shown in FIG. 13B, the accuracy slightly degraded in the week 2 and week 3 results compared to week 1. It is likely that re-training the IP address classifier frequently to reflect the new domain-IP resolutions data would result in detection accuracy close to that of G-Baseline.

BP vs. Path Based

The path-based inference algorithm had a complexity of $O(s|V|^2)$, where s was the size of the malicious seed and V was the set of vertexes in a domain graph. Even with the help of distributed computing platforms such as Hadoop or Spark, it could have still been quite expensive to handle large-scale DNS data. In this section, the experiment investigated techniques to strike a good balance between detection accuracy and efficiency. One natural alternative was BP. The BP algorithm was implemented in C program and ran in a single multi-core server with 48 2.7-GHz cores and 256 GB memory. The experiments followed the convergence rules of BP with the convergence threshold and the maximum number of iterations are empirically selected as 1×10-10 and 15, respectively.

Applying BP directly on the domain-IP bipartite graph corresponding to the whole DNS data yielded very poor detection accuracy in prior research. The reason is that the maliciousness of an IP address cannot be concluded simply because a malicious domain is resolved to it. In other words, hosting relationships alone were not strong enough to reliably reason the maliciousness of unknown domains and IP addresses. As shown above, the enhanced domain graph captured much stronger relationships between domains. It would be compelling to investigate how BP on domain graphs could assist in producing results with acceptable accuracy and much less computational cost. As in each round of BP a single message was passed along each edge, the complexity of one-round BP is simply $O(|E|)$, where E was the set of edges. In a sparse graph, $|E|$ was multi-magnitude smaller than $|V|^2$. Though in the worst case, many rounds of propagation had to be performed until convergence, in practice it is often sufficient to stop after a pre-determined constant number of rounds (e.g., 15 or 20). Thus, BP over the domain graph could be much more efficient than using the path-based algorithm.

Note that the path-based algorithm was specifically designed for malicious domain detection over domain graphs (e.g., the explicit decay mechanism and the particular way of combining inferences from multiple malicious seeds). BP on the other hand was a generic inference algorithm that could only implicitly reflect some of the intuitions behind the path-based approach (e.g., the influence of a node was diminishing when a message was passed along a long path), which may have led to lower detection accuracy.

A possible way to apply BP over domain graphs was explored, based on the following approach. A new bipartite graph reduced by the domains in domain graph was created. This was labeled the induced bipartite graph. In detail, given the original domain resolution graph, in order to construct the induced bipartite graph, an edge between a domain d and an IP address was created only if d is in the domain graph. The resulting bipartite graph would have had the same set of domains as the domain graph, but would have been much sparser than the domain graph. Therefore, running BP over this reduced bipartite graph would also have been be more efficient than over the domain graph.

Figure 14A:
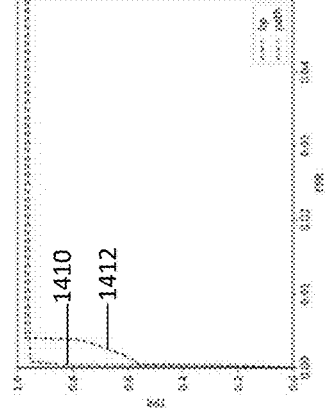
FIGS. 14A-14I illustrate the results of experimental validation of a method of the present disclosure.
Figure 14B:
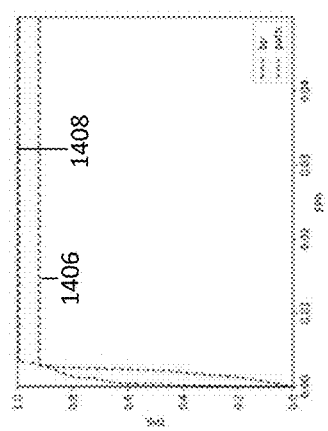
Figure 14C:
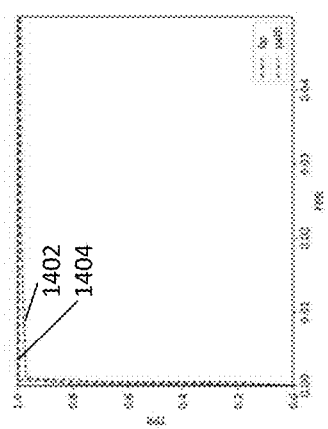
Figure 14D:
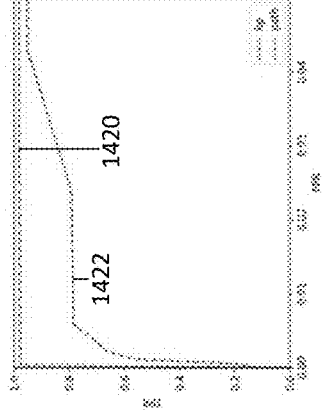
Figure 14E:
Figure 14F:
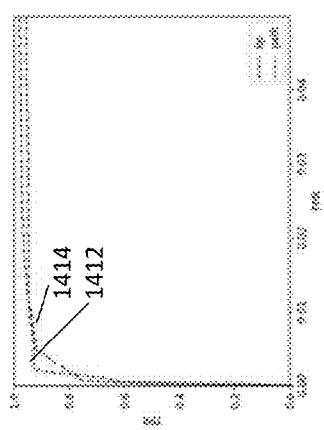
Figure 14G:
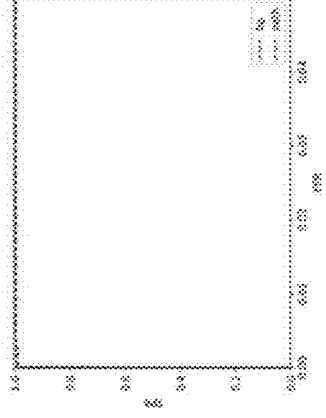
Figure 14H:
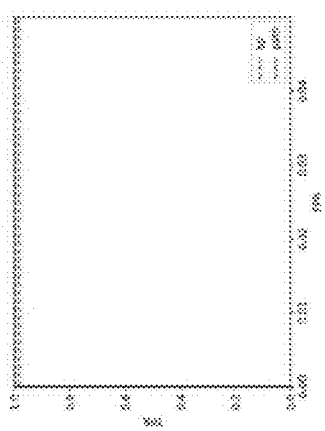
Figure 14I:
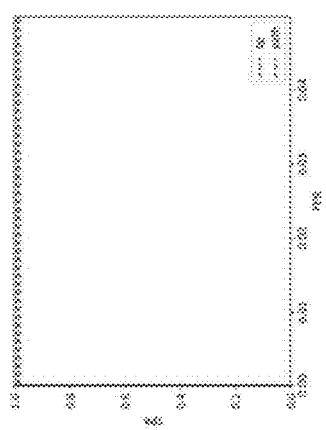

FIGS. 14A-I compare the accuracy of running BP over induced bipartite graphs for the three different approaches with that of running path-based algorithm over the three domain graphs. FIGS. 14A-C compare BP with path-based inference for G-Baseline for the first week, second week, and third week, respectively. The BP based results are represented by line 1402, 1406, and line 1410 in FIGS. 14A, 14B, and 14C, respectively. The path-based results are represented by line 1404, 1408, and line 1412 in FIGS. 14A, 14B, and 14C, respectively. The similarity comparisons are made in FIGS. 14D-F and FIGS. 14G-I for G-IP address and G-Domain, respectively. The BP based results are represented by line 1412, 1416, and line 1420 in FIGS. 14D, 14E, and 14F, respectively. The path-based results are represented by line 1414, 1418, and line 1422 in FIGS. 14D, 14E, and 14F, respectively. In FIGS. 14G-14I, the "bp" curve is the slightly lower curve, but still essentially equal to the "path" curve. These results show that the accuracy of BP was either comparable or only slightly less than that of path-based algorithm. The slight degradation of accuracy at the gain of much better performance was likely due to the following reasons. First, the inference from the induced bipartite graphs became less direct. An edge in the domain graph then corresponded to multiple indirect paths due to intermediate IP address nodes in the bipartite graph. The longer the paths, the weaker the inference became. Second, probably more importantly, the induced bipartite graph could have introduced unreliable associations. For example, two domains, that were initially connected due to their association with IP addresses from two hosting providers, may have created connections with other public IP addresses that did not exhibit the association rules creating connections with unrelated domains. However, such cases were rare as the results of the two algorithms were quite comparable.

The G-IP-Domain graph provided the best results in terms of accuracy and coverage. FIGS. 15A-B show the performance of G-IP-Domain approach for different weeks and the average performance in comparison to other three approaches. In FIG. 15A, the first, second, and third week results are represented by curves 1502, 1504, and 1506, respectively. As shown in FIG. 15A, the accuracy across different weeks was fairly stable with FPR over 99% for TPR less than 0.8%. In FIG. 15B, the experimental results for G-Baseline, G-Domain, G-IP, and G-IP-Domain are represented by curves 1508, 1510, 1512, and 1514, respectively. Compared to other approaches, as shown in FIGS. 15A-B, G-IP-Domain performs slightly better on average with respect to G-IP and comparably to G-Baseline and G-Domain.

To analyze whether the generalized approaches discussed above could apply to datasets that vary temporally from the original data set, a week-4 dataset was selected that contained the first seen Domain-IP tuples from Jan. 15, 2019 to Jan. 21, 2019. FIGS. 16A-B show the ROC curves using Path-based and BP algorithms from the week-4 dataset. In FIG. 16A, the results for G-Baseline, G-IP, and G-Domain are represented by curves 1602, 1604, and 1606, respectively. In FIG. 16B, the experimental results for G-Baseline, G-IP, G-Domain, and G-IP-Domain are represented by curves 1606, 1608, 1610, and 1612, respectively. While Path-based inference over all types of domain graphs performed quite well, BP over all types of domain graphs performed even better, yielding a high TPR of above 98% with a low FPR less than 0.3%. The accuracy measurements were consistent with those for the datasets from November 2018. Further, the domain graph size and the number of detected domains were proportional to those for the datasets from November 2018. Thus, the algorithms were applicable to new datasets and could be used to perform continuous detection of malicious domains by utilizing a 7-day sliding window as the input.

The invention is claimed as follows:

1. A method for detecting a malicious domain comprising:
   providing data to a machine learning module, wherein the machine learning module was previously trained on a plurality of Internet Protocol ("IP") address attributes and a plurality of domain attributes and a list of known malicious domains, and wherein the data comprises a plurality of domains and a plurality of IP addresses;
   classifying each of the plurality of domains and the plurality of IP addresses within the data based on the plurality of IP address attributes and the plurality of domain attributes;
   associating each of the plurality of domains and the plurality of IP addresses within the data based on the corresponding classification;
   building a weighted domain graph based on the classification and association of each of the plurality of domains and the plurality of IP addresses within the data; and
   assessing the maliciousness of a domain based on the weighted domain graph,
   wherein the plurality of IP address attributes comprises a plurality of IP address attribute sets,
   wherein the plurality of IP address attribute sets comprise:
      a domain based attribute set comprising a first attribute detailing a number of fully qualified domain names, a second attribute detailing a number of third level domains, a third attribute detailing a mean duration, and fourth attribute detailing a standard deviation of duration;
      an IP address block based attribute set comprising a fifth attribute detailing a number of IP addresses in its/24 IP address block, a sixth attribute detailing a number of second level domains in its/24 IP address block, a seventh attribute detailing a number of third level domains in its/24 IP address block, and an eighth attribute detailing an entropy of IP addresses in its/24 IP address block; and
      a query based attribute set comprising a ninth attribute detailing an average number of daily queries for each IP address, a tenth attribute detailing a mean number of DNS lookup queries per domain, and an eleventh attribute detailing a standard deviation of the number of DNS lookup queries per domain.

2. The method of claim 1, wherein the plurality of domain attributes comprises a plurality of domain attribute sets.

3. The method of claim 2, wherein the plurality of domain attribute sets comprises the following:
   a domain based attribute set comprising a twelfth attribute detailing an average Jaccard similarity between subdomains of the same apex domain, a thirteenth attribute detailing a standard deviation of the number of fully qualified domain names ("FQDNs") belonging to the same apex domain, a fourteenth attribute detailing an average presence of generic top level domains in a subdomain part of each FQDN, a fifteenth attribute detailing a standard deviation of the presence of generic top level domains in a subdomain part of each FQDN, a sixteenth attribute detailing an entropy of the subdomains of each apex domain, a seventeenth attribute detailing an average number of top frequently seen subdomains of each apex domain, and an eighteenth attribute detailing an average number of popular subdomains belonging to a given apex domain over each resolved IP address;
   an IP address based attribute set comprising a nineteenth attribute detailing the similarity of the IP addresses hosting all domains, a twentieth attribute detailing an average number of IP addresses on which each domain resolves to per day, a twenty-first attribute detailing the standard deviation of the number of IP addresses on which each domain resolves to per day, a twenty-second attribute detailing the number of 24-subnets in which IP addresses are hosting domains;
   a query based attribute set comprising a twenty-third attribute detailing an average of a number of DNS lookup queries and a twenty-fourth attribute detailing a standard deviation of the number of DNS lookup queries; and
   a hosting based attribute set comprising a twenty-fifth attribute detailing an average of hosting durations of all hosted domains and a twenty-sixth attribute detailing a standard deviation of hosting durations of all hosted domains.

4. The method of claim 3, wherein classifying each of the plurality of domains and the plurality of IP addresses within the data based on the plurality of IP address classifier and the plurality of apex domain classifier comprises classifying domains or IP addresses as public or dedicated.

5. The method of claim 4, wherein:
   a public classification denotes an apex domain whose subdomains belong to and controlled by different entities;
   a dedicated classification denotes an apex domain whose subdomains belong to and controlled by the same entity;
   a public IP address classification denotes an IP address used to host two or more unrelated domains controlled by different entities; and
   a dedicated IP address classification denotes an IP address used to host domains all of which are controlled by the same entity.

6. The method of claim 5, wherein classifying each of the plurality of domains and the plurality of IP addresses within the data based on the plurality of IP address classifier and the plurality of apex domain classifier further comprises the use of a random forest classification algorithm.

7. The method of claim 6, wherein associating each of the plurality of domains and the plurality of IP addresses within the data based on its classification comprises associating domains based on the plurality of IP address classifications.

8. The method of claim 6, wherein associating each of the plurality of domains and the plurality of IP addresses within the data based on its classification comprises associating domains based on the plurality of apex domain classifications.

9. The method of claim 6, wherein associating each of the plurality of domains and the plurality of IP addresses within the data based on its classification comprises:
   associating domains based on the plurality of IP address classifications; and
   associating domains based on the plurality of apex domain classifications.

10. The method of claim 9, wherein associating domains based on the plurality of IP address classifications comprises:
    a first act of association wherein each of the plurality of domains are associated to another one of the plurality of domains that shares at least one IP address classified as a dedicated IP address;
    a second act of association wherein each of the plurality of domains are associated to any one of the plurality of domains that share more than one IP address classified as a public IP address from more than one hosting provider.

11. The method of claim 10, wherein associating domains based on the plurality of apex domain classifications comprises:
    a third act of association, wherein each of the plurality of domains, classified as dedicated, are associated with the same dedicated apex domain.

12. The method of claim 11, wherein building a weighted domain graph based on the classification and association of each of the plurality of domains and the plurality of IP addresses within the data comprises building a weightless domain graph.

13. The method of claim 12, wherein building a weighted domain graph based on the classification and association of each of the plurality of domains and the plurality of IP addresses within the data comprises building an apex domain association from the domain graph or the weighted domain graph.

14. The method of claim 12, wherein building a weighted domain graph based on the classification and association of each of the plurality of domains and the plurality of IP addresses within the data comprises building a domain-IP address association from the domain graph or the weighted domain graph.

15. The method of claim 12, wherein building the weighted domain graph comprises:
    determining a first association weight between at least two associated domains based on at least a set of shared classified IP addresses, a set of shared IP addresses classified as dedicated, a set of shared IP addresses classified as public, and a set of hosting providers to which the set of shared IP addresses classified as public belong;
    determining a second association weight between at least two associated domains based on at least a shared apex domain classification and the number of hosting providers to which a set of IP addresses corresponding to the at least two associated domains belong.

16. The method of claim 15 wherein assessing the maliciousness of a domain based on the weighted domain graph comprises using a belief propagation algorithm based on at least a domain-IP association derived from the domain graph.

17. A malicious domain assessment system comprising:
    a processor; and
    a memory storing instructions which, when executed by the processor, cause the processor to:
    provide data to a machine learning module, wherein the machine learning module was previously trained on a plurality of IP address classifier and a plurality of apex domain classifier and wherein the data comprises a plurality of domains and a plurality of IP addresses;
    classify each of the plurality of domains and the plurality of IP addresses within the data based on the plurality of IP address classifier and the plurality of apex domain classifier;
    associate each of the plurality of domains and the plurality of IP addresses within the data based on its classification;
    build a weighted domain graph based on the classification and association of each of the plurality of domains and the plurality of IP addresses within the data; and
    assess the maliciousness of a domain based on the weighted domain graph,
    wherein the plurality of IP address classifier comprises a plurality of IP address attribute sets,
    wherein the plurality of IP address attribute sets comprise:
       a domain based attribute set comprising a first attribute detailing a number of fully qualified domain names, a second attribute detailing a number of third level domains, a third attribute detailing a mean duration, and fourth attribute detailing a standard deviation of duration;
       an IP address block based attribute set comprising a fifth attribute detailing a number of IP addresses in its/24 IP address block, a sixth attribute detailing a number of second level domains in its/24 IP address block, a seventh attribute detailing a number of third level domains in its/24 IP address block, and an eighth attribute detailing an entropy of IP addresses in its/24 IP address block; and
       a query based attribute set comprising a ninth attribute detailing an average number of daily queries for each IP address, a tenth attribute detailing a mean number of DNS lookup queries per domain, and an eleventh attribute detailing a standard deviation of the number of DNS lookup queries per domain.

18. A non-transitory, computer-readable medium storing instructions which, when performed by a processor, cause the processor to:
    provide data to a machine learning module, wherein the machine learning module was previously trained on a plurality of IP address classifier and a plurality of apex domain classifier and wherein the data comprises a plurality of domains and a plurality of IP addresses;
    classify each of the plurality of domains and the plurality of IP addresses within the data based on the plurality of IP address classifier and the plurality of apex domain classifier;
    associate each of the plurality of domains and the plurality of IP addresses within the data based on its classification;
    build a weighted domain graph based on the classification and association of each of the plurality of domains and the plurality of IP addresses within the data; and
    assess the maliciousness of a domain based on the inference on the weighted domain graph,
    wherein the plurality of IP address classifier comprises a plurality of IP address attribute sets,
    wherein the plurality of IP address attribute sets comprise:
       a domain based attribute set comprising a first attribute detailing a number of fully qualified domain names, a second attribute detailing a number of third level domains, a third attribute detailing a mean duration, and fourth attribute detailing a standard deviation of duration;

an IP address block based attribute set comprising a fifth attribute detailing a number of IP addresses in its/24 IP address block, a sixth attribute detailing a number of second level domains in its/24 IP address block, a seventh attribute detailing a number of third level domains in its/24 IP address block, and an eighth attribute detailing an entropy of IP addresses in its/24 IP address block; and a query based attribute set comprising a ninth attribute detailing an average number of daily queries for each IP address, a tenth attribute detailing a mean number of DNS lookup queries per domain, and an eleventh attribute detailing a standard deviation of the number of DNS lookup queries per domain.

* * * * *